US008527710B2

(12) United States Patent
Sato et al.

(10) Patent No.: US 8,527,710 B2
(45) Date of Patent: Sep. 3, 2013

(54) STORAGE CONTROLLER AND METHOD OF CONTROLLING STORAGE CONTROLLER

(75) Inventors: Kei Sato, Chigasaki (JP); Takeo Fujimoto, Odawara (JP); Osamu Sakaguchi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 785 days.

(21) Appl. No.: 12/310,448

(22) PCT Filed: Feb. 17, 2009

(86) PCT No.: PCT/JP2009/000645
§ 371 (c)(1),
(2), (4) Date: Feb. 25, 2009

(87) PCT Pub. No.: WO2010/095166
PCT Pub. Date: Aug. 26, 2010

(65) Prior Publication Data
US 2011/0029736 A1 Feb. 3, 2011

(51) Int. Cl.
G06F 12/00 (2006.01)
G06F 13/00 (2006.01)

(52) U.S. Cl.
USPC .......... 711/135; 711/141; 711/143; 711/147; 711/154; 711/156; 711/E12.022

(58) Field of Classification Search
USPC ................. 711/141, 143, 135, 147, 154, 156, 711/E12.022
See application file for complete search history.

(56) References Cited

U.S. PATENT DOCUMENTS

| 5,353,428 | A | * | 10/1994 | Shibata ........................ 711/145 |
| 5,506,967 | A | | 4/1996 | Barajas et al. |
| 6,466,988 | B1 | * | 10/2002 | Sukegawa et al. ........... 709/248 |
| 6,484,242 | B2 | * | 11/2002 | Hosoya et al. ................ 711/144 |
| 2003/0110157 | A1 | | 6/2003 | Maki et al. |
| 2006/0236052 | A1 | | 10/2006 | Minowa |
| 2010/0083120 | A1 | | 4/2010 | Ito et al. |

FOREIGN PATENT DOCUMENTS

| EP | 1 376 348 A2 | 6/2003 |
| EP | 1 376 348 A3 | 6/2003 |
| EP | 1 577 772 A1 | 10/2004 |
| EP | 1 818 794 A2 | 6/2006 |
| JP | 02-226449 | 9/1990 |
| JP | 10-301659 | 11/1998 |

(Continued)

OTHER PUBLICATIONS

International Search Report and Written Opinion of PCT/JP2009/000645, mailed on Jul. 30, 2009.

(Continued)

Primary Examiner — Midys Rojas
(74) Attorney, Agent, or Firm — Stites & Harbison PLLC; Juan Carlos A. Marquez, Esq.; Nicholas B. Trenkle, Esq.

(57) ABSTRACT

The storage controller of the present invention is able to reduce the amount of purge message communication and increase the processing performance of the storage controller. Each microprocessor creates and saves a purge message every time control information in the shared memory is updated. After a series of update processes are complete, the saved purge messages are transmitted to each microprocessor. To the control information, attribute corresponding to its characteristics is established, and cache control and purge control are executed depending on the attribute.

15 Claims, 18 Drawing Sheets

(56) References Cited

FOREIGN PATENT DOCUMENTS

| | | |
|---|---|---|
| JP | 11-102321 | 4/1999 |
| JP | 2006-285778 | 4/2005 |
| JP | 2006-011932 | 1/2006 |
| JP | 2007-280127 | 10/2007 |

OTHER PUBLICATIONS

Office Action, issued from Japanese Patent Office, in corresponding Japanese Patent Application No. 2011-514949, dated Jun. 19, 2012, pp. 1-5.

* cited by examiner

STORAGE CONTROLLER AND METHOD OF CONTROLLING STORAGE CONTROLLER

TECHNICAL FIELD

The present invention relates to a storage controller and a method of controlling the storage controller.

BACKGROUND ART

Storage controllers use a plurality of storage devices such as hard disk drives to provide a host computer with a RAID (Redundant Arrays of Inexpensive Disks)-based storage area. Storage controllers comprise a plurality of microprocessors, each of which shares data stored in shared memory. Processing time is required for the microprocessors to directly access the shared memory and use the data, and therefore a constitution in which a portion of the shared data is used by being copied to a local memory disposed close to the microprocessor has been proposed.

PATENT CITATION 1

JP-A-2006-285778

With the prior art, when any of the microprocessors updates the data in the shared memory, data which has been copied to another local memory (that is, data which has been cached in another local memory) must be discarded. This is because the data that has been copied to each local memory is old and cannot be used when the data in the shared memory which constitutes original data is changed.

Therefore, in cases where the data in the shared memory is updated, a report that data stored in local memory cannot be used is sent by the microprocessor which performed the data update to each of the other microprocessors. This report is called a 'purge message' here. The other microprocessors which receive this purge message then know that the data copied to the local memory is old and cannot be used. The other processors therefore access the shared memory, read new data, and store the new data in the local memory.

When each microprocessor updates data in the shared memory relatively frequently, a multiplicity of purge messages are exchanged between each of the microprocessors. A multiplicity of processes including the creation of a purge message, the transmission of the purge message, and the discarding of data in the local memory based on the purge message are performed.

That is, with the prior art, a multiplicity of purge messages are communicated between each of the microprocessors and therefore a bottleneck is easily created by the purge message-related processes. There is therefore the problem that it is difficult to improve the processing performance of the storage controller.

DISCLOSURE OF INVENTION

It is therefore an object of the present invention to provide a storage controller and a method of controlling the storage controller which are designed to allow an improvement in processing performance by reducing the amount of purge messages communicated between the plurality of microprocessors. It is a further object of the present invention to provide a storage controller and method of controlling the storage controller which are designed to allow an improvement in processing performance by categorizing information stored in a shared memory into a plurality of categories and controlling the transmission of purge messages depending on the quality of each piece of information. Further objects of the present invention will become apparent from the following embodiments.

In order to solve the above problems, a storage controller of a first aspect of the present invention is a storage controller for controlling data inputs and outputs between a host computer and a storage device, comprising a shared memory for storing common control information; a plurality of microprocessors; local memory units which are provided in correspondence with each of the microprocessors and to each of which at least a portion of the common control information stored in the shared memory is copied as local control information items; a purge message storage unit for storing a purge message, which is transmitted from one of the microprocessors to each of the other microprocessors, or to specified one or a plurality of microprocessors, and which is for reporting that the local control information items stored in the local memory units are invalid; and a control information synchronization management unit for managing whether each of the local control information items is in sync with the common control information item, wherein, in cases where the common control information is updated, each of the microprocessors creates the purge message and store the purge message in the purge message storage unit and transmit the purge message stored in the purge message storage unit asynchronously with the update of the common control information.

A second aspect is the storage controller of the first aspect, further comprising:

a plurality of microprocessor packages, each of the microprocessor packages having at least one of the microprocessors, at least one of the local memory units, and at least one purge message storage unit, wherein each of the microprocessor packages and the shared memory are connected via a switch;

the shared memory has, in addition to the common control information, a common control information update management unit for managing an update status of the common control information;

each of the local memory units stores, in addition to the local control information items and the purge message storage unit, a local update management unit for managing an update status of the local control information items, and an update value storage unit which stores a copy of a value indicating the update status managed by the common control information update management unit;

the common control information update management unit manages microprocessor identification information items for identifying each of the microprocessors in each of the microprocessor packages and a counter value indicating a count which is updated by each of the microprocessors in association with each other, and is configured such that, in cases where the common control information is updated by the microprocessor, the counter value corresponding to the microprocessor which is the source of the update is updated by the update-source microprocessor;

each of the local update management units also manages the counter values associated with each of the microprocessor identification information items and, in cases where each of the microprocessors corresponding to each of the local update management units updates the local control information items, the counter value associated with the corresponding microprocessor is updated, and the counter values corresponding to the other microprocessors are updated based on the purge message associated with the microprocessors other than the corresponding microprocessor;

in cases where each of the microprocessors corresponding to each of the update value storage units accesses the common control information in the shared memory, each of the counter values managed by the common control information update management unit Is acquired, and each of the acquired counter values is stored in the update value storage unit by overwriting;

the shared memory includes a common cache region for storing information which each of the microprocessors is capable of copying to each of the local memory units, an exclusive cache region for storing information which only an owner microprocessor configured as an owner among the microprocessors is capable of copying to the local memory unit in the owner microprocessor and which cannot be copied by the microprocessors other than the owner microprocessor, and a noncache region for storing information which none of the microprocessors is able to copy to each of the local memory units;

the common cache region stores first information which has a relatively low update frequency but can be accessed relatively frequently by a plurality of microprocessors;

the exclusive cache region stores second information which is referenced or updated relatively frequently by the owner microprocessor;

the noncache region stores third information which is referenced or updated relatively frequently by a plurality of microprocessors;

when information stored in the common cache region is updated, each of the microprocessors creates the purge message whenever the update is performed and stores the purge message in the purge message storage unit and, after a series of update processes are complete, transmits each of the purge messages stored in the purge message storage unit to each of the other microprocessors;

when information stored in the exclusive cache region is updated, each of the microprocessors does not create the purge message in cases where the microprocessor itself is the owner microprocessor and, in cases where the microprocessor itself is a microprocessor other than the owner microprocessor, each of the microprocessors creates the purge message whenever the update is performed and stores the purge message in the purge message storage unit and, after a series of update processes are complete, transmits each of the purge messages stored in the purge message storage unit to only the owner microprocessor;

when information stored in the noncache region is updated, each of the microprocessors does not create the purge message; and each of the microprocessors is configured to transmit the purge message to integrate a plurality of updates when identical sections, contiguous sections, or overlapping sections in the common control information are updated.

A third aspect is the storage controller of the first aspect, wherein each of the microprocessors uses the local control information items from each of the corresponding local memory units in cases where judgment is made that each of the local control information items is in sync with the common control information based on the control information synchronization management unit, and use the common control information in the shared memory in cases where judgment is made that each of the local control information items is not in sync with the common control information based on the control information synchronization management unit.

A fourth aspect is the storage controller of the first aspect, wherein the shared memory has, in addition to the common control information, a common control information update management unit for managing an update status of the common control information; each of the local memory units stores, in addition to the local control information items and the purge message storage unit, a local update management unit for managing an update status of local control information items, and an update value storage unit for storing a copy of a value indicating the update status managed by the common control information update management unit; and the control information synchronization management unit is constituted comprising the common control information update management unit, the local update management units, and the update value management units.

A fifth aspect is the storage controller of the fourth aspect, wherein the common control information update management unit manages microprocessor identification information items for identifying each of the microprocessors in each of the microprocessor packages and a counter value indicating a count which is updated by each of the microprocessors in association with each other, and is configured such that, in cases where the common control information is updated by the microprocessor, the counter value corresponding to the microprocessor which is the source of the update is updated by the update-source microprocessor; and each of the local update management units also manages the counter values in association with each of the microprocessor identification information items and, in cases where each of the microprocessors corresponding to each of the local update management units updates the local control information items, the counter value associated with the corresponding microprocessor is updated, and the counter values corresponding to the other microprocessors are updated based on the purge message associated with the microprocessors other than the corresponding microprocessor.

A sixth aspect is the storage controller of the fifth aspect, wherein, in cases where each of the microprocessors corresponding to each of the update value storage units accesses the common control information in the shared memory, each of the counter values managed by the common control information update management units is acquired and each of the acquired counter values is stored in the update value storage unit by overwriting.

A seventh aspect is the storage controller of the first aspect, wherein the shared memory comprises a common cache region for storing information which each of the microprocessors is capable of copying to each of the local memory units; and an exclusive cache region for storing information which only an owner microprocessor configured as an owner among the microprocessors is capable of copying to the local memory unit in the owner microprocessor and which cannot be copied by the microprocessors other than the owner microprocessor.

An eighth aspect is the storage controller of the first aspect, wherein the shared memory comprises a common cache region for storing information which each of the microprocessors is capable of copying to each of the local memory units; and a noncache region for storing information which none of the microprocessors is capable of copying to each of the local memory units.

A ninth aspect is the storage controller of the first aspect, wherein the shared memory comprises an exclusive cache region for storing information, which only an owner microprocessor configured as an owner among each of the microprocessors is capable of copying to the local memory unit in the owner microprocessor, and which microprocessors other than the owner microprocessor are incapable of copying; and a noncache region for storing information which none of the microprocessors is capable of copying to each of the local memory units.

A tenth aspect is the storage controller of the first aspect, wherein the shared memory comprises a common cache region for storing information which each of the microprocessors is capable of copying to each of the local memory units; an exclusive cache region for storing information which only an owner microprocessor configured as an owner among the microprocessors is capable of copying to the local memory unit in the owner microprocessor and which microprocessors other than the owner microprocessor are incapable of copying; and a noncache region for storing information which none of the microprocessors is capable of copying to each of the local memory units.

An eleventh aspect is the storage controller of the tenth aspect, wherein the common cache region stores first information which has a relatively low update frequency but which can be accessed relatively frequently by a plurality of microprocessors; the exclusive cache region stores second information which the owner microprocessor references or updates relatively frequently; and the noncache region stores third information which is referenced or updated relatively frequently by a plurality of microprocessors.

A twelfth aspect is either the tenth aspect or the eleventh aspect, wherein, when information stored in the common cache region is updated, each of the microprocessors creates the purge message whenever the update is performed and stores the purge message in the purge message storage unit and, after a series of update processes are complete, transmits each of the purge messages stored in the purge message storage unit to each of the other microprocessors; when information stored in the exclusive cache region is updated, each of the microprocessors does not create the purge message in cases where the microprocessor itself is the owner microprocessor and, in cases where the microprocessor itself is a microprocessor other than the owner microprocessor, each of the microprocessors creates the purge message whenever the update is performed and stores the purge message in the purge message storage unit and, after a series of update processes are complete, transmits each of the purge messages stored in the purge message storage unit to only the owner microprocessor; and, when information stored in the noncache region is updated, each of the microprocessors does not create the purge message.

A thirteenth aspect is the storage controller of the first aspect, wherein each of the microprocessors transmits the purge message so that the purge message incorporates a plurality of updates in cases where identical sections, contiguous sections, overlapping sections in the common control information are updated.

A fourteenth aspect is the storage controller of the first aspect, wherein each of the microprocessors monitors whether each of the other microprocessors is performing monitoring normally and, in cases where a fault is generated in any of the microprocessors, acquires each count value managed by the common control information update management unit and stores each count value in the update value storage unit by overwriting; each of the microprocessors judges, for the microprocessor in which the fault is generated, whether a count value managed by the local update management unit is different from a count value stored in the update value management unit; in cases where the count value managed by the local update management unit is different from the count value stored in the update value management unit, each of the microprocessors overwrites the count value of the microprocessor, in which the fault is generated and which is managed by the local update management unit, with the corresponding count value in the update value management unit; and each of the microprocessors clears the local control information copied to the local memory unit.

A method of controlling a storage controller of a fifteenth aspect is a method of controlling a storage controller having a shared memory which stores common control information, a plurality of microprocessors, and a local memory unit provided in correspondence with each of the microprocessors, the method comprising: at least a portion of the common control information which is stored in the shared memory being copied as local control information to each of the local memory units; in cases where the common control information is updated, a purge message indicating that the local control information stored in each of the local memory units other than the local memory unit corresponding to a microprocessor which is the source of the update is invalid being created and saved; in cases where a series of processes for updating the common control information are complete, the saved purge message being transmitted to each of the microprocessors corresponding to each of the other local memory units; and each of the other microprocessors which have received the purge message accessing the shared memory to acquire the information of an invalid section in cases where such information is used.

The aspects of the present invention can also be combined in various ways other than those specified, and these combinations are included in the scope of the present invention.

BRIEF DESCRIPTION OF DRAWINGS

FIG. 1 is a conceptual view of an embodiment of the present invention.
FIG. 2 is a block diagram of a storage controller.
FIG. 3 is a schematic view of the constitution of local memory units and shared memory.
FIG. 4 shows the constitution of a purge buffer.
FIG. 5 shows an aspect in which purge messages are integrated.
FIG. 6 shows the relationships between each update clock.
FIG. 7 shows a method of judging the size of a clock.
FIG. 8 is a flowchart showing the creation and transmission of a purge message.
FIG. 9 is a block diagram of the essential parts of a storage controller according to a second embodiment.
FIG. 10 shows a cache attribute management table.
FIG. 11 shows an example of data stored in the shared memory.
FIG. 12 is a flowchart of processing to write data to the shared memory.
FIG. 13 is a flowchart which follows on from FIG. 12.
FIG. 14 is a flowchart showing processing to transmit a purge message.
FIG. 15 is a flowchart showing processing to read data from the shared memory.

FIG. 16 is a flowchart showing processing executed by a storage controller according to a third embodiment, for a case where a fault is generated in a microprocessor.

FIG. 17 is a flowchart showing processing executed by a microprocessor which has recovered from a fault.

FIG. 18 is a block diagram showing the essential parts of a storage controller according to a fourth embodiment.

EXPLANATION OF REFERENCE

Figure 1:
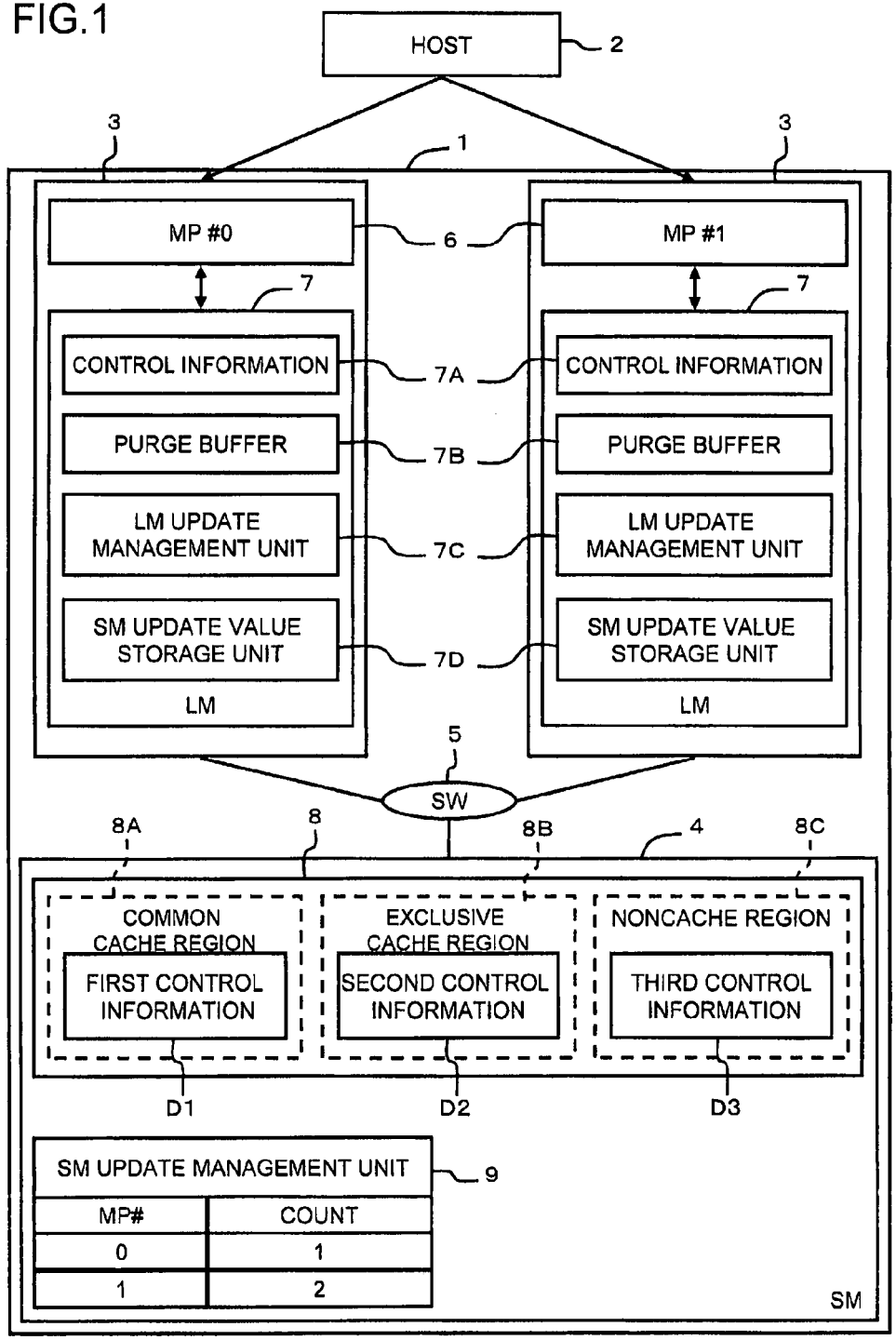
[FIG. 1]

1: Storage controller
3: Microprocessor package
4: Shared memory
5: Switch
6: Microprocessor
7: Local memory unit
8A: Shared cache region
8B: Exclusive cache region
8C: Noncache region
10: Storage controller
110: Front-end package
120: Microprocessor package
121: Microprocessor
122: Local memory unit
130: Memory package
131: Shared memory
140: Back-end package
151: Storage device

BEST MODE FOR CARRYING OUT THE INVENTION

FIG. 1 is an explanatory diagram of essential parts of an embodiment of the present invention. The constitution shown in FIG. 1 does not limit the scope of the present invention. Constitutions other than the constitution shown in FIG. 1 are also included in the scope of the present invention. A storage controller 1 according to this embodiment is connected to a host computer (abbreviated to 'host' hereinbelow) 2. The host 2 can be a computer terminal such as a server computer, a mainframe computer, an engineering workstation, or a personal computer, for example.

FIG. 1 shows essential parts of the storage controller 1. The storage controller 1 comprises a plurality of microprocessor packages 3, a shared memory 4, and a switch 5. The storage controller 1 can further comprise a plurality of storage devices 151 as shown in the subsequent embodiments.

Although FIG. 1 shows two microprocessor packages 3, three or more microprocessor packages can also be provided. Each of the microprocessor packages 3 comprises a microprocessor 6 and a local memory unit 7, for example.

The microprocessors 6 execute predetermined processing by interpreting commands from the host 2 and send back the processing results to the host 2. The local memory units 7 comprise local control information 7A, a purge buffer 7B, a local memory update management unit 7C, and a shared memory update value storage unit 7D, for example. The drawings display the local memory units and shared memory abbreviated to 'LM' and 'SM' respectively. There are also instances in the embodiments where the local memory units and shared memory are abbreviated to 'LM' and 'SM' respectively.

The local control information 7A is part of the control information which. is stored in the shared memory 4. Control information can include information which is required for command processing and/or control by the storage controller 1 such as numbers for identifying logical volumes, information for managing RAID configurations, and information for managing jobs, for example.

The purge buffer 7B is a storage region for storing purge messages. The purge messages of this embodiment fulfill a plurality of roles. One such role is to report that the local control information 7A stored in the local memory units 7 is invalid. In this case, purge messages are messages for requesting that the local control information 7A cached in the local memory units 7 be purged.

Another role is to report to the other microprocessors 6 the number of times (counter value) that control information in the shared memory 4 has been updated by a certain microprocessor 6. In this case, the purge message is an update report message. A purge message can be made to fulfill either the role of a purge request message or an update report message by configuring a predetermined bit in the purge message.

A purge message for a purge request is created and stored in the purge buffer 7B each time each microprocessor 6 updates control information in the shared memory 4. In cases where the same region or contiguous regions are updated, a plurality of updates are consolidated in one purge message.

When a series of updates relating to control information in the shared memory 4 are complete, an update report purge message is created and stored in the purge buffer 7B. After the update report purge message is stored in the purge buffer 7B, each purge message in the purge buffer 7B is transmitted to the other microprocessor 6.

The LM update management units 7C are management units for managing the status of control information updates by the microprocessors 6. The LM update management units 7C manage the number of updates (counter value) for each of the microprocessors 6. For example, in cases where a microprocessor 6(#0) has updated control information in the shared memory 4, the LM update management unit 7C sets the counter value of the microprocessor 6(#0) to '1'. In addition, in cases where the microprocessor 6(#0) has updated control information in the shared memory 4, the counter value is changed to '2'.

In cases where another microprocessor 6(#1) which is shown center left in FIG. 1 has updated the control information in shared memory 4, the update is reported via the purge message mentioned earlier. Upon receipt of the purge message, which is an update report message, from the microprocessor 6(#1), the microprocessor 6(#0 ) updates the counter value of the microprocessor 6(#1) in the LM update management unit 7C.

The counter value of each microprocessor 6 managed by the SM update management unit 9 in the shared memory 4 is copied with predetermined timing to the SM update value storage unit 7D. Predetermined timing can be when the microprocessor 6 accesses the shared memory 4, for example. In cases where other control information which is not included in the local control information 7A is employed, for example, the microprocessor 6 accesses the shared memory 4 and acquires the desired control information. Here, each counter value managed by the SM update management unit 9 is read and stored in the SM update value storage unit 7D.

The shared memory 4 is connected to each microprocessor package 3 via the switch 5. The shared memory 4 comprises a control information storage region 8 and an SM update management unit 9. The control information storage region 8 is a region for storing control information. The control information stored in the control information storage region 8 is shared by each of the microprocessors 6.

The control information storage region 8 includes a common cache region 8A, an exclusive cache region 8B, and a noncache region 8C. The common cache region 8A is shared by each microprocessor 6 and stores first control information D1 which is cached by each microprocessor 6. The exclusive cache region 8B can serve as a cache only for a specified microprocessor 6 which is the owner microprocessor, while the other microprocessor 6 stores second control information D2 which cannot be cached. The noncache region 8C stores third control information D3 which cannot be cached by either of the microprocessors 6.

The first control information D1 corresponds to information which has a relatively low update frequency and can be referenced relatively frequently by a plurality of microprocessors 6 such as information for managing the constitution of the storage controller 1 and program product settings information and the like, for example.

The second control information D2 corresponds to information which the specified microprocessor 6 updates relatively frequently such as information for managing logical volumes and information for managing remote copy differential data, for example. Here, the specified microprocessor is called the owner microprocessor. The microprocessor which is not the owner microprocessor is referred to as the non-owner microprocessor or second microprocessor. For the sake of understanding, the owner microprocessor is labeled 6(#0) and the other microprocessor is labeled 6(#1).

The third control information D3 corresponds to information with a relatively low update frequency such as information for managing various jobs executed by the storage controller 1 and fault-related information, and the like, for example. However, the examples of the first to third control information are not limited to the aforementioned types of information. The first to third control information can be changed depending on the control system of the storage controller 1.

In this embodiment, control information is categorized into a plurality of categories based on the way in which the control information is used and so forth and stored in the shared memory 4 with control attributes assigned to the control information. The first control information D1 in the common cache region 8A can be cached by each of the microprocessors 6. Each of the microprocessors 6 are equal where the first control information D1 is concerned and each of the microprocessors 6 uses the first control information D1 by copying same to the respective local memory units 7. Because each of the microprocessors 6 uses the first control information D1 by copying same to the local memory units 7 (that is, because the first control information D1 is cached), purge messages are exchanged between each of the microprocessors 6.

The second control information D2 in the exclusive cache region 8B can only be copied to the local memory units 7 by the owner microprocessor 6(#0) (that is, only the owner microprocessor 6(#0) is able to cache the information) and the other microprocessor 6#1) is unable to copy the second control information D2 to the local memory units 7. The second microprocessor 6(#1) desiring to use the second control information D2 uses the second control information D2 by accessing the shared memory 4.

Since only the owner microprocessor 6 (#0) is able to copy the second control information D2 to the local memory units 7, the owner microprocessor 6(#0) does not need to transmit a purge message to the second microprocessor 6(#1) even when the second control information D2 in the shared memory 4 is updated. In cases where the second microprocessor 6(#1) updates the second control information D2 in the shared memory 4, a purge message is transmitted from the second microprocessor 6(#1) to the owner microprocessor 6(#0).

The third control information D3 in the noncache region 8C cannot be copied to the local memory units 7 by any of the microprocessors 6. Each of the microprocessors 6 directly accesses the shared memory 4 to use the third control information D3 when it is required. Purge messages for the third control information D3 are therefore not exchanged between each of the microprocessors 6.

The SM update management unit 9 manages the number of times each of the control information items D1 and D2 in the shared memory 4 are updated by each of the microprocessors 6. An update count need not be managed for the third control information D3 in the noncache region 8C.

The SM update management unit 9 associates and manages microprocessor numbers (MP#) for identifying each of the microprocessors 6 and the update counts (COUNT) for updates by each of the microprocessors 6. The LM update management units 7C and SM update value storage units 7D each manage the microprocessor numbers in association with each other. That is, the units 7C, 7D, and 9 each have the same arrangement. However, the timing and so forth with which the update counts are updated is different. Here, the update counts are also called 'counter values'.

The purge control will now be described by focusing on the first control information D1. By appending (#0) and (#1) to the local memory units 7, purge buffers 7B, LM update management units 7C, and SM update value storage units 7D hereinbelow, a distinction between the constitution of the first microprocessor 6(#0) and the constitution of the second microprocessor 6(#1) can be made.

When the first microprocessor 6(#0) updates the first control information D1 in the shared memory 4, the counter value for the first microprocessor 6(#0) is increased by one in the LM update management unit 7C(#0) which corresponds to the first microprocessor 6(#0). A purge request purge message is created for the update by the first microprocessor (#0) of the first control information D1. The purge request purge message thus created is stored in the purge buffer 7B(#0).

In addition, in cases where the first microprocessor 6(#0) updates the first control information D1 in the shared memory 4, the first microprocessor 6(#0) increases the counter value for the first microprocessor 6(#0) in the SM update management unit 9 by one.

The first microprocessor 6(#0) updates first control information D1 in the shared memory 4 a plurality of times in response to commands from the host 2, for example. A purge request purge message is created and stored for each of the plurality of updates. In cases where the purge messages can be consolidated into one purge message, the plurality of purge messages are incorporated in one purge message.

When a series of updates are complete, an update report purge message is created. The update report purge message includes the microprocessor number and counter value of the first microprocessor 6(#0) which are stored in the LM update management unit 7C(#0).

The update report purge message is stored in the purge buffer 7B(#0) and, when a predetermined opportunity arises, each purge request purge message and one update report purge message which are stored in the purge buffer 7B(#0) are transmitted to the second microprocessor 6(#1). Opportunities for transmitting the purge messages include a case where a series of updates to control information in the shared memory 4 are complete and a program is explicitly called or a case where the number of purge messages stored in the purge buffer 7B reaches a preset upper limit value, for example.

Upon receiving the purge messages from first microprocessor 6(#0), the second microprocessor 6(#1) invalidates the first control information D1 stored in the local memory 7(#1) on the basis of the purge request purge message.

In addition, the second microprocessor 6(#1) updates the counter value of the first microprocessor 6(#0) in the LM update management unit 7C(#1) on the basis of the update report purge message received from the first microprocessor 6(#0).

Thus, in cases where the microprocessor 6(#0) which was the source of the update updates the control information in the shared memory 4, the counter value associated with the microprocessor 6(#0) which is the source of the update (referred to as the update-source microprocessor hereinbelow) is updated substantially at the same time in the LM update management unit 7C(#0) and the SM update management unit 9 of the update-source microprocessor 6(#0).

The second microprocessor 6(#1) which is not the update-source microprocessor 6(#0) updates the counter value of the update-source microprocessor 6(#0) in the LM update management unit 7C(#1) on the basis of the update report purge message received from the update-source microprocessor 6(#0).

Each counter value read from the SM update management unit 9 is copied to the SM update value storage unit 7D when the microprocessors 6 access the shared memory 4. As mentioned earlier, the counter value of the SM update management unit 9 associated with the update-source microprocessor 6(#0) is updated in sync with the update processing by the update-source microprocessor 6(#0).

Therefore, the second microprocessor 6(#1) which is a microprocessor other than the update-source microprocessor 6(#0 is capable of judging whether the first control information D1 stored in the local memory unit 7(#1) is valid by comparing all the counter values in the SM update value storage unit 7D(#1) with all of the counter values in the LM update management unit 7C(#1). Here, the SM update value is sometimes denoted 'target' (TGT) in order to make a clear distinction between the shared memory 4 and the SM update value storage unit 7D.

In cases where all of the counter values COUNT(LM#1) in the LM update management unit 7C(#1) are equal to or greater than all of the counters COUNT (TGT#1) in the SM update value storage unit 7D(#1) (COUNT(LM#1)>= COUNT (TGT#1)), the first control information D1 stored in the local memory unit 7(#1) can be judged as being valid.

Conversely, in cases where COUNT(LM#1)<COUNT (TGT#1), it can be judged that the purge message that has still not arrived from the update-source microprocessor 6(#0) exists. Hence, in this case, first control information D1 stored in the local memory unit 7(#1) is possibly old and cannot be used.

The operation of the purge control was described for the first control information D1 stored in the common cache region 8A but the second control information D2 stored in the exclusive cache region 8B can be understood in the same way.

However, only the owner microprocessor 6(#0) is able of cache the second control information D2. Therefore, even in cases where the owner microprocessor 6(#0) updates the second control information D2 in the shared memory 4, there is no need to transmit a purge request purge message to the second microprocessor 6 #1). That is, the owner microprocessor 6 #0) does not need to create a purge message which is associated with the second control information D2 and save the purge message.

The second microprocessor 6(#1) is capable of directly accessing and updating the second control information D2 in the shared memory 4. The second control information D2 is copied to the local memory unit 7(#0) in the owner microprocessor 6(#0). Therefore, in cases where the second microprocessor 6(#1) updates the second control information D2, a purge request purge message is transmitted from the second microprocessor 6(#1) to the owner microprocessor 6 (#0).

This embodiment so constituted affords the following effects. First, with this embodiment, purge request purge messages are transmitted and received between each of the microprocessors 6 after a series of updates of the control information in the shared memory 4 are complete. Therefore, the frequency with which the purge request purge messages are communicated can be reduced and the load for the purge processing can be reduced. As a result, the processing resources of the microprocessors 6 can be used to process commands from the host 2 and the processing performance of the storage controller 1 can be increased.

Second, in this embodiment, in cases where the same or contiguous locations of control information are updated, this plurality of updates can be consolidated into one purge request purge message. Therefore, the communication frequency of the purge request purge message can be reduced and the processing performance of the storage controller 1 can be raised.

Third, in this embodiment, by comparing the counter values in the LM update management unit 7C with the counter values in the SM update value storage unit 7D, it is possible to judge the validity of control information cached in the local memory units 7. The erroneous usage of old control information can therefore be prevented and consistency in the operation of the storage controller can be preserved.

Fourth, in this embodiment, 'common cache', 'exclusive cache' and 'noncache' are prepared as attributes for the control information stored in the shared memory 4 and purge control is performed in accordance with these attributes. The creation of purge messages and transmission-related processing can therefore be reduced and the processing resources and so forth of each of the microprocessors 6 can be utilized more effectively. This embodiment will be described in detail hereinbelow.

[Embodiment 1]

Figure 2:
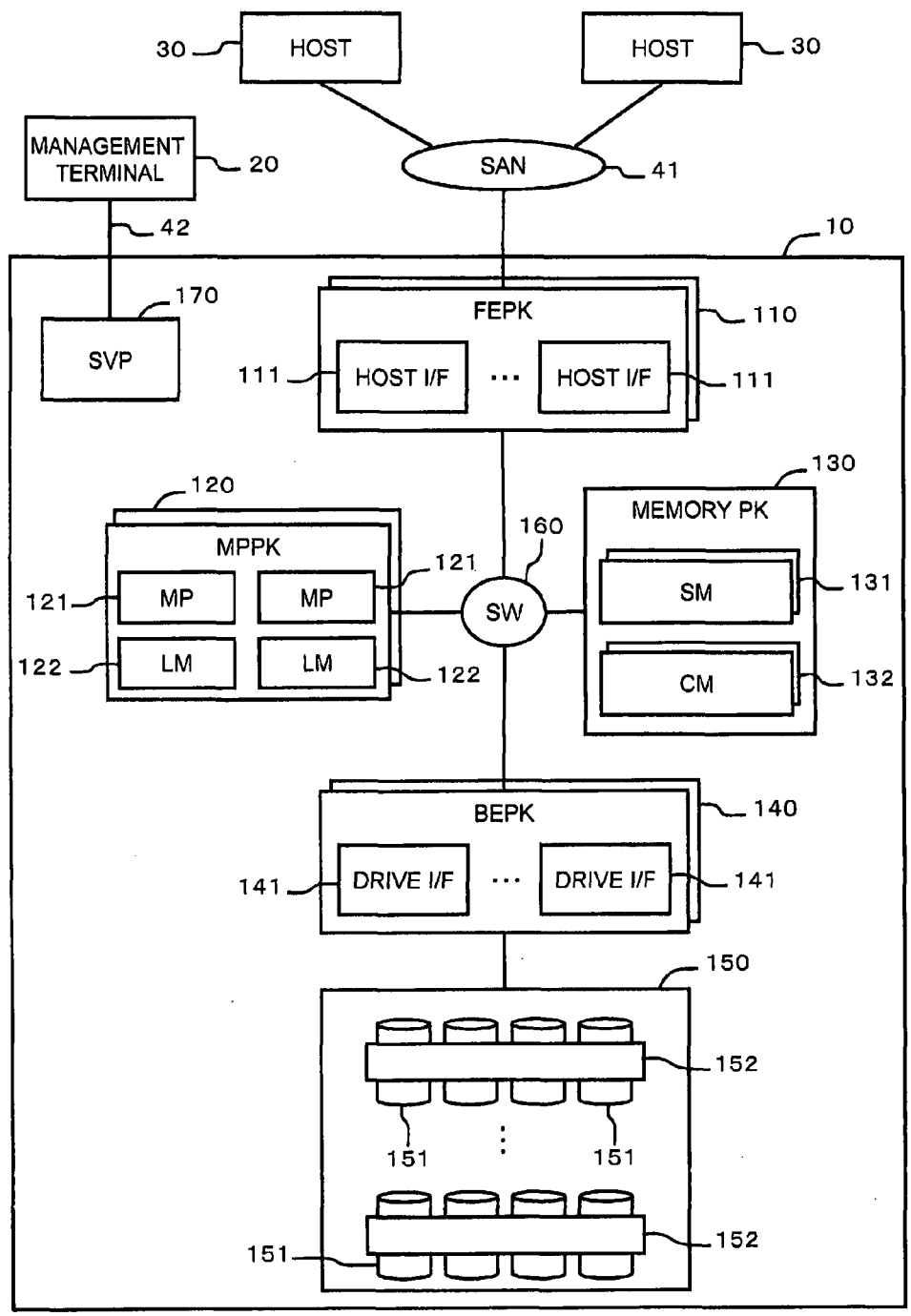
[FIG. 2]

FIG. 2 shows the whole information processing system of a storage controller 10. In this embodiment, a case where control information is not categorized will be described. The correspondence relationship with FIG. 1 will be described first. The storage controller 10 corresponds to the storage controller 1, host 30 corresponds, to the host 2, shared memory 131 corresponds to the shared memory 4, microprocessors 121 correspond to the microprocessors 6, and local memory units 122 correspond to the local memory units 7. Control information D10L shown in FIG. 3 corresponds to the control information 7A, purge buffers T10 shown in FIG. 3 correspond to the purge buffers 7B, LM update clocks T11 shown in FIG. 3 correspond to the LM update management units 7C, target update clocks T12 shown in FIG. 3 correspond to the SM update value storage units 7D, SM update clocks T13 shown in FIG. 3 correspond to the SM update management units 9. First control information D11 in FIG. 9 corresponds to the first control information D1, second control information D12 in FIG. 9 corresponds to the second control information D2, and third control information D13 in FIG. 9 corresponds to the third control information D3.

The storage controller 10 comprises a front-end package 110 (FEPK 110 in FIG. 2), a microprocessor package 120 (MPPK 120 in FIG. 2), a memory package 130 (memory PK 130 in FIG. 2), a back-end package 140 (BEPK 140 in FIG. 2), a switch 160, and a service processor 170 (SVP 170 in FIG. 2), for example.

The front-end package 110 is a control substrate for handling communications with the host 30. The front-end package 110 comprises a plurality of communication ports 111. The communication ports 111 are connected to the host 30 via a communication network 41. An FC-SAN (Fibre Channel_Storage Area Network) or an IP_SAN (Internet Protocol_ SAN), for example, can be employed as the communication network 41.

When an FC-SAN is employed, the host 30 and front-end package 110 perform data communications in accordance with the Fibre Channel protocol. When the host 30 is a mainframe, data communications are performed in accordance with a communication protocol such as FICON (Fibre Connection: registered trademark), ESCON (Enterprise System Connection: registered trademark), ACONARC (Advanced Connection Architecture: registered trademark), or FIBARC (Fibre Connection Architecture: registered trademark), for example. When IP_SAN is used, the host 30 and front-end package 110 perform data communications in accordance with a protocol such as TCP/IP (Transmission Control Protocol/Internet Protocol).

The back-end package 140 is a control substrate for handling communications with the storage device 151. The back-end package 140 comprises a plurality of communication ports 141 and each of the communication ports 141 is connected to each of the storage devices 151.

The memory package 130 comprises a shared memory region 131 and a cache memory region 132. The shared memory region 131 stores commands and various control information which are received from the host 30, for example. The cache memory region 132 stores user data and a table for managing the cache memory region 132, for example. In the following description, the cache memory region 132 is called the cache memory 132.

The microprocessor package 120 is a control substrate for controlling the operation of a module 100. The microprocessor package 120 comprises microprocessors 121 and local memory units 122.

The microprocessor packages 120 execute commands which are issued by the host 30 and transmits the results of the command execution to the host 30. In cases where the front-end package 110 receives a read command, the microprocessor package 120 acquires the requested data from the cache memory region 132 or storage device 151 and transmits the requested data to the host 30.

When the front-end package 110 receives a write command, the microprocessor package 120 writes the write data to the cache memory 132 and reports the end of processing to the host 30. The data written to the cache memory 132 is then written to the storage device 151. The constitution of the microprocessor package 120 will be described in more detail in FIG. 3.

The storage device 151 is constituted by a storage device such as a hard disk drive or a flash memory device. A plurality of storage devices 151 can be grouped into one group 150, and the group 150 is called a 'RAID group' or a 'parity group', for example. One or a plurality of logical volumes 152 are formed in the storage region resulting from this grouping.

Devices which can be utilized as the storage devices 151 include various devices capable of reading and writing data such as hard disk devices, semiconductor memory devices, optical disk devices, magneto-optical disk devices, magnetic tape devices, and flexible disk devices, for example.

In cases where hard disk devices are employed as the storage devices 151, FC (Fibre Channel) disks, SCSI (Small Computer System Interface) disks, SATA disks, ATA (AT Attachment) disks, SAS (Serial Attached SCSI) disks, and so forth, for example, can be used.

In cases where semiconductor memory devices are used as the storage devices 151, flash memory, FeRAM (Ferroelectric Random Access Memory), MRAM (Magnetoresistive Random Access Memory), Ovonic Unified Memory, RRAM (Resistance RAM) and the like, for example, can be utilized. The types of storage devices are not limited to the aforementioned types and various other previously manufactured storage devices can also be utilized.

The switch 160 is a circuit for connecting each of the packages 110, 120, 130, and 140. The front-end package 110, back-end package 140, and microprocessor package 130 access the memory package 130 via the switch 160.

The SVP 170 is a control circuit for gathering various information in the storage controller 10 and supplying this information to a management terminal 20, and for storing set values and the like which are input by the management terminal 20 in the shared memory 131. The SVP 170 is connected to the management terminal 20 via a communication network 42 such as a LAN (Local Area Network), for example.

Figure 3:
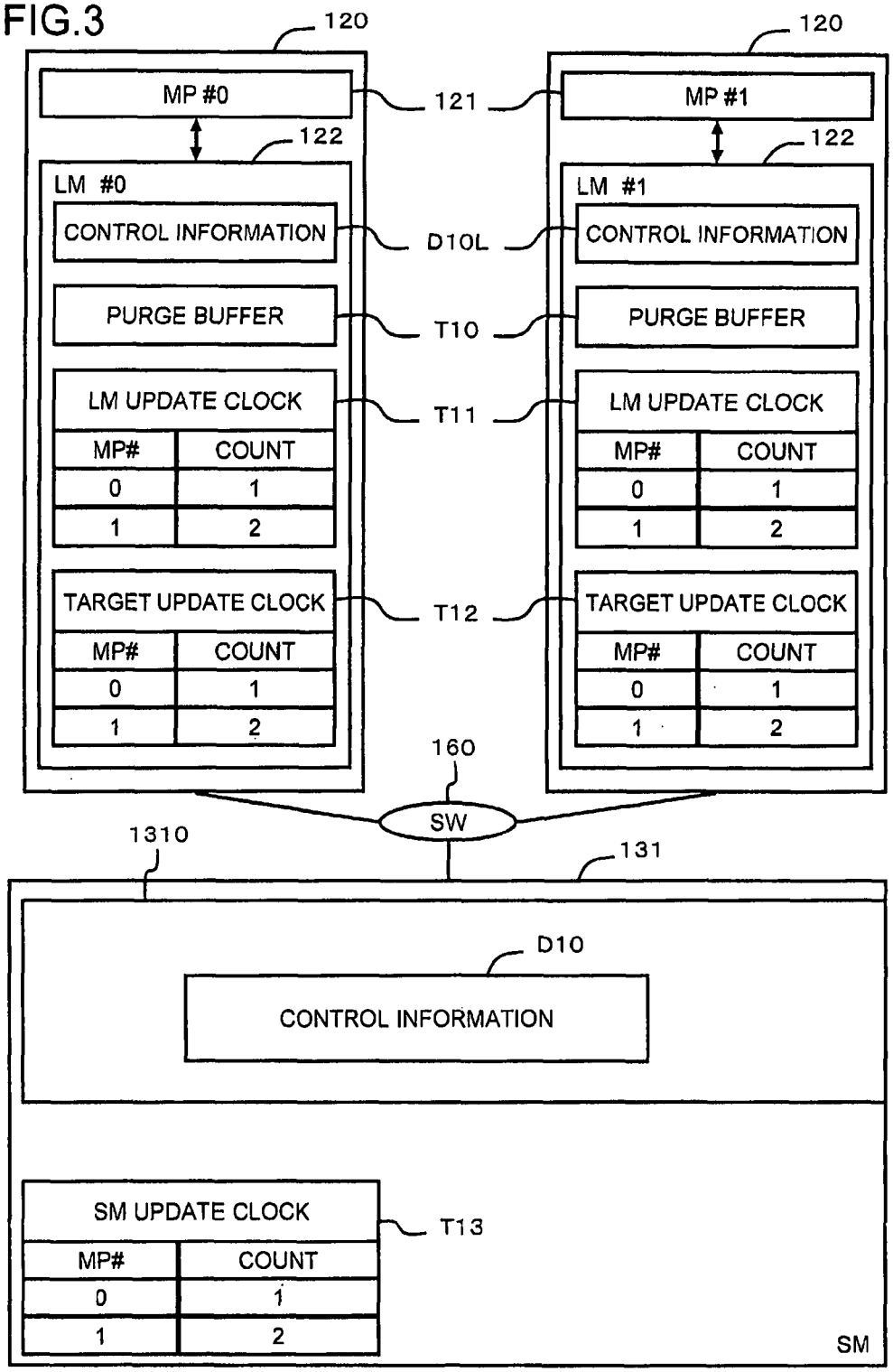
[FIG. 3]

FIG. 3 is a schematic view of the constitution of the microprocessor package 120. The local memory units 122 store the control information D10L, the purge buffer T10, the LM update clock T11, and the target update clock T12.

The control information DI0L copies part of the control information D10 in the shared memory region 131. The purge buffer T10 stores purge messages, which will be described subsequently using FIG. 4. The LM update clock T11 manages updates by the microprocessors 121 in the local memory units. The target update clock T12 copies each of the counter values of the SM update clock T13 in the shared memory 131 with predetermined timing.

The shared memory 131 comprises a control information storage region 1310 and an SM update clock T13. The control information storage region 1310 stores control information D10. The SM update clock T13 manages counter values which indicate the number of updates by each of the microprocessors 121 for each of the microprocessor numbers identifying each microprocessor 121. Each of the LM update clocks T11 and each of the target update clocks T12 manage the microprocessor numbers and counter values in association with each other. That is, each of the update clocks T11, T12, and T13 has the same constitution.

Figure 4:
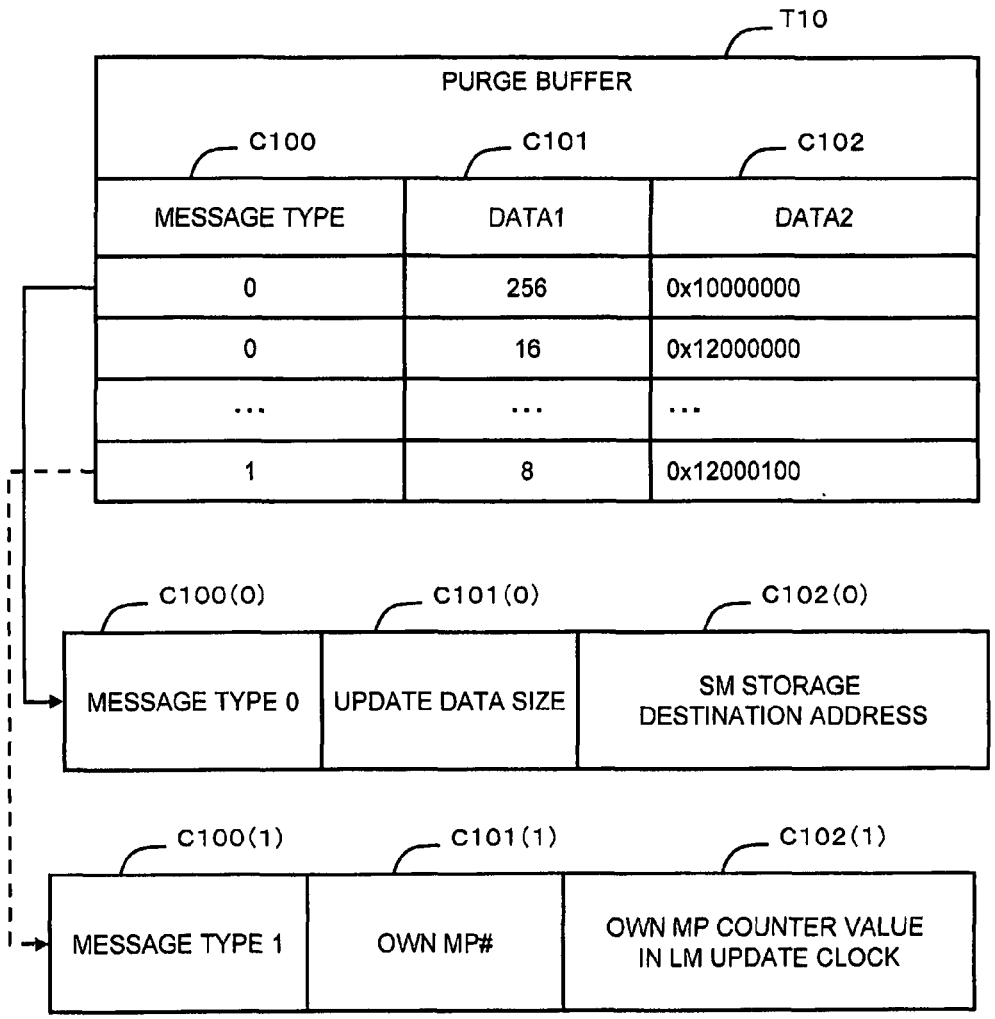
[FIG. 4]

FIG. 4 shows the constitution of the purge buffer. The purge buffer T10 comprises a message type field C100, a first data field C101, and a second data field C102, for example.

The message type field C100 stores the type of purge message which indicates that the purge message is a purge request purge message or an update report message. The message type 0 indicates that a purge message is a purge request purge message.

In cases where a purge message is a purge request purge message, the size of the updated data is stored in the first data field C101. The number of lines is set as the data size, for example. One line is 64 bytes, for example. When a purge message is a purge request purge message, the second data field C102 stores the storage destination address (start address) in the shared memory 131. That is, if a purge request purge message is used, it is clear that data (control information D10), from the start address indicated by the second data field C102 to the size indicated by the first data field C101, have been updated.

A message type 1 denotes an update report purge message. In the case of an update report purge message, the first data field C101 stores the microprocessor number (MP#) of the issuing microprocessor 121 which issues the update report purge message. The second data field C102 stores the counter value of the issuing microprocessor 121 among each of the counter values in the LM update clock T11 managed by the issuing microprocessor 121.

Each time the update-source (subsequently 'issuing') microprocessor 121 updates the control information in the shared memory 131, a purge message of message type 0 is created and registered in the purge buffer T10. When a series of updates are complete, a purge message of message type 1 is created and registered in the purge buffer T10.

Figure 5:
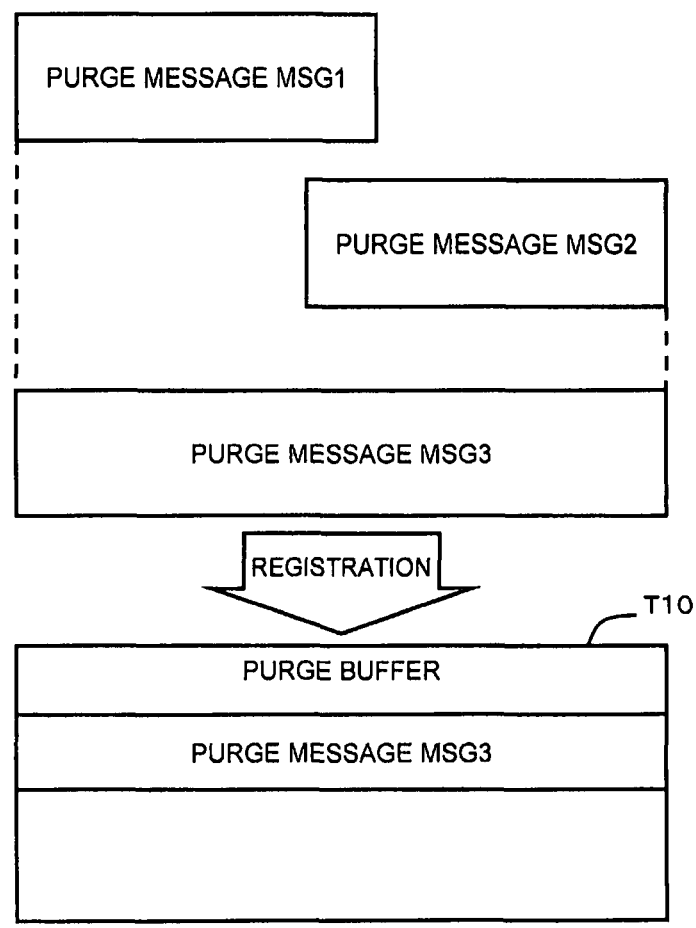
[FIG. 5]

FIG. 5 shows an aspect in which a plurality of purge request purge messages are incorporated in one purge message. The update location of a first purge message MSG1 and the update location of a second purge message MSG2 are the same, contiguous, or overlapping, and these purge messages MSG1 and 2 are incorporated in one purge message MSG3 which is then stored in the purge buffer T10. The number of purge messages can thus be reduced and the communication frequency of the purge messages can be reduced.

Figure 6:
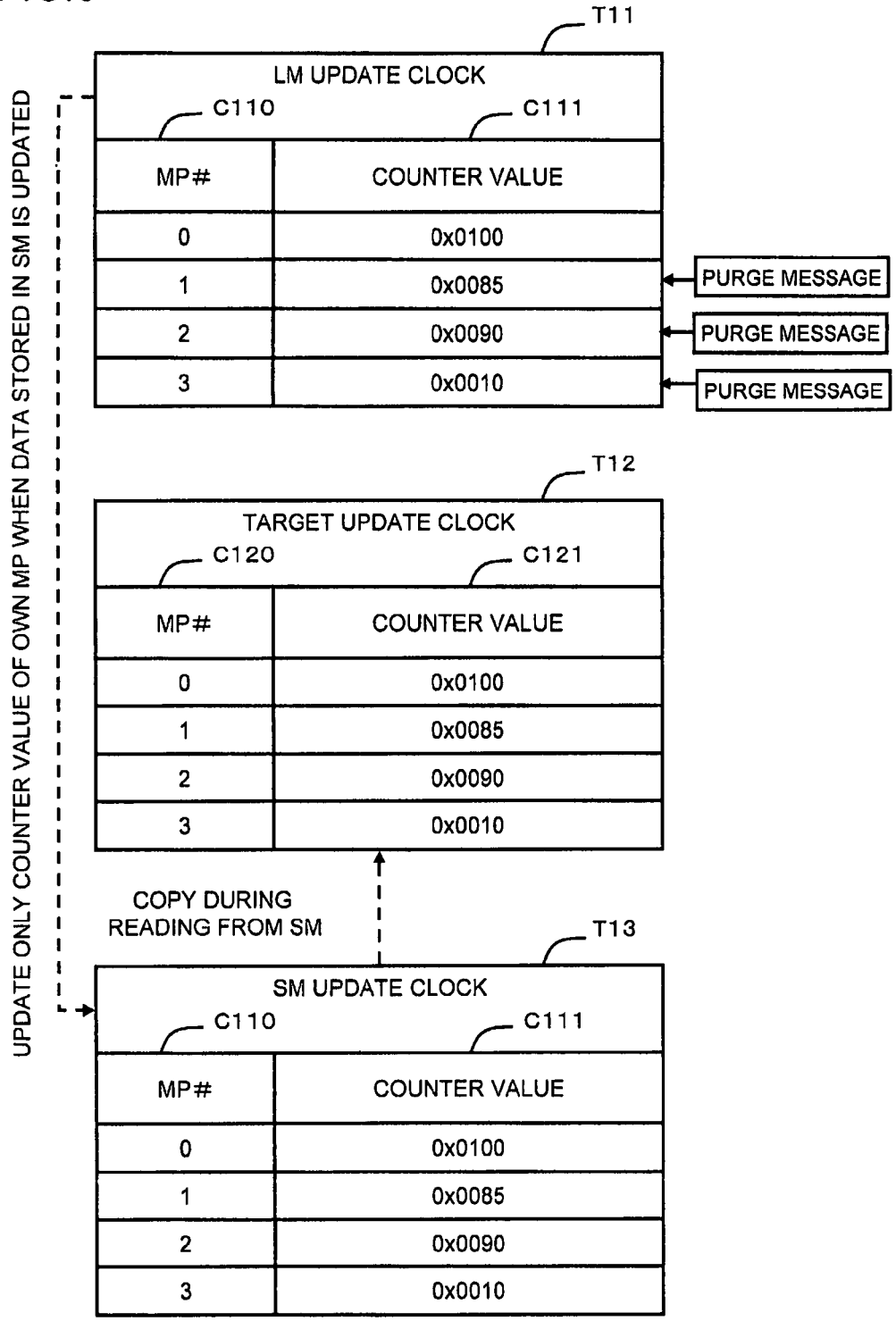
[FIG. 6]

FIG. 6 shows the relationships between the LM update clock T11, the target update clock T12, and the SM update clock T13. The LM update clock T11 stores each of the counter values managed by each of the microprocessor packages 120.

The counter values of the microprocessors 121 which manage the LM update clocks T11 are updated in real time in conjunction with the update of the control information D10 by the microprocessors 121. For example, for the LM update clock T11 which is managed by the microprocessor 121(#0), the counter value of the microprocessor 121(#0) is recorded in the LM update clock T11 substantially at the same time as the update processing. Each of the counter values of the other microprocessors 121(#1 to #3) are updated on the basis of the update report purge messages issued by the other microprocessors 121(#1 to #3).

Figure 7:
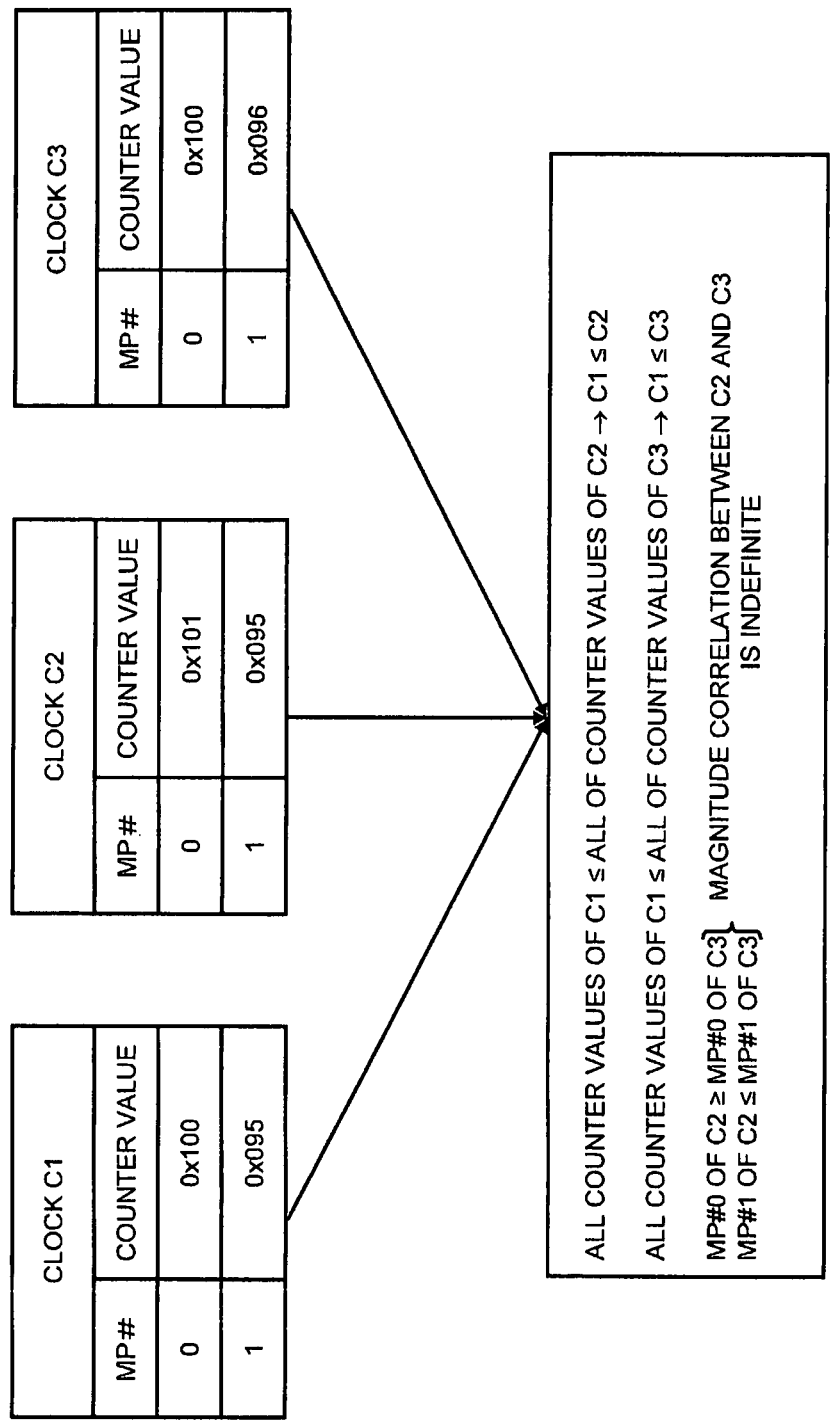
[FIG. 7]

FIGS. 2 and 7 and so forth show two microprocessors 121, FIG. 4 shows a case where there are at least eight microprocessors 121 and FIG. 6 shows a case where there are four microprocessors 121 but these numbers of microprocessors are not exceeded in the illustrations for the sake of convenience in the description. The present invention is useful in the case of a constitution in which a plurality of microprocessors 121 share the shared memory 131. In order to avoid confusion, the first embodiment will focus on a case where there are two microprocessors 121.

The target update clock T12 shown in FIG. 6 is a copy of the SM update clock T13 as mentioned earlier. For example, in cases where the microprocessors 121 use control information other than the control information D10L cached in the local memory 7 (when a cache miss occurs), the microprocessors 121 access the control information D10 in the shared memory 131. In cases where the microprocessors 121 access the shared memory 131, each of the counter values of the SM update clocks T13 in the shared memory 131 are read and copied to the target update clocks T12.

The SM update clock T13 shown in FIG. 6 manages the number of times the control information D10 is updated by each of the microprocessors 121. As mentioned earlier, the counter value for the update-source microprocessor 121 in the LM update clock T11 managed by the update-source microprocessor 121 and the counter value for the update-source microprocessor 121 in the SM update clock T13 are updated substantially in sync. In cases where the other microprocessors 121 each access the shared memory 131, the counter values in the SM update management clock T13 are each copied to the target update clocks T12 managed by each of the other microprocessors 121.

FIG. 7 is a schematic view of a method of judging the size of the update clock. As mentioned earlier, each of the update clocks T11, T12, and T13 has the same structure in which the microprocessor numbers and counter values are associated. The validity of the control information D10L copied to the logical memory unit 122 is judged based on the magnitude correlation between each of the counter values stored in the LM update clock T11 and each of the counter values stored in the target update clock T12.

The magnitude correlation between each of the update clocks is judged as follows and will be described with the update clocks C1 to C3 shown in FIG. 7 serving as an example. In cases where each of the counter values of the update clock C2 is equal to or more than the corresponding counter values of the update clock C1, as is the case in the relationship between the update clock C1 and update clock C2, it is judged that C2>=C1. The sizes of the counter values are compared for the same microprocessor number.

Likewise, when the relationship between the update clocks C1 and C3 is considered, each of the counter values of the update clock C3 is equal to or more than each of the corresponding counter values of the update clock C1. It is therefore judged that C3>=C1.

When the relationship between the update clocks C2 and C3 is considered, for microprocessor number #0, the counter values of the update clock C2 are greater than the corresponding counter values of the update clock C3. However, for the other microprocessor number #1, the counter values of the update clock C2 are smaller than the corresponding counter values of the update clock C3. Therefore, the relationship between the update clocks C2 and C3 is indefinite and it is not possible to make the distinction of whether the counter values of either one are larger or smaller than those of the other.

Figure 8:
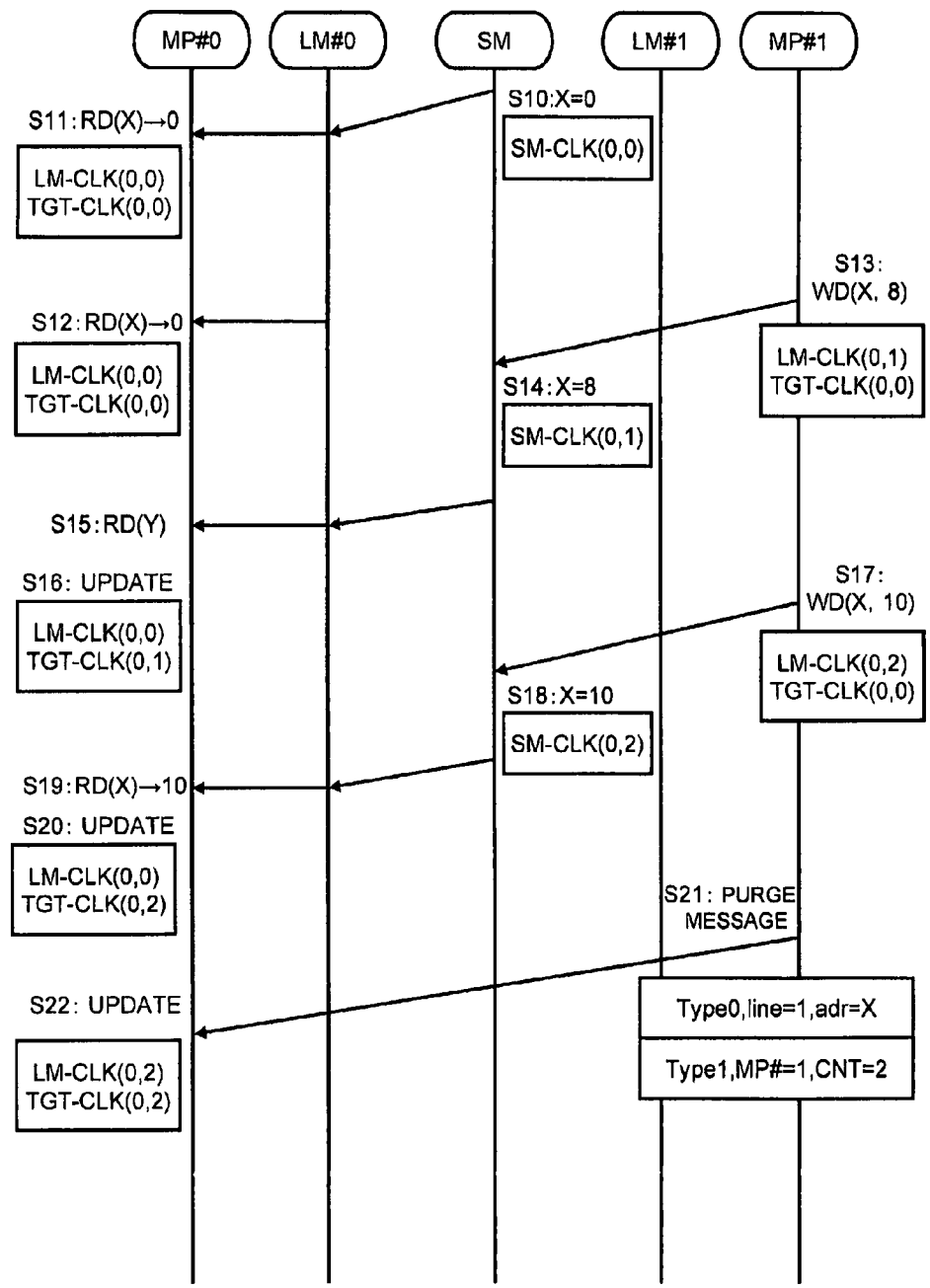
[FIG. 8]

FIG. 8 is a flowchart showing a purge control operation. An address X of the shared memory 131 stores data "0" which is part of the control information D10 (S10). The microprocessor 121(#0) reads the data "0" from address X of the shared memory 131 (S11). The data "0" thus read are stored in the local memory unit 122(#0).

The value of the LM update clock (LM-CLK) T1(#0) at this point is (0,0). The former "0" is the counter value of the microprocessor 121(#0) and the latter "0" is the counter value of the microprocessor 121(#1). The values of the target update clock (TGT-CLK) T12(#0) are also (0,0).

In cases where the microprocessor 121(#0) is to reference the data at address X once again, data "0" which is cached in the local memory unit 122(#0) is used (S12). When the counter value in the LM update clock and the counter value in the target update clock are compared, because the relationship LM-CLK>=TGT-CLK is established, the data "0" stored in the local memory unit 122(#0) can be used.

A case where the other microprocessor 121(#1) writes data "8" to address. X will now be described (S13). The counter value of the update-source microprocessor 121(#1) in the LM update clock T11 managed by the update-source microprocessor 121(#1) is increased by one. Hence, the LM-CLK(LM update clock) changes from (0,0) to (0,1). The counter values of the SM update clock (SM-CLK) T13 in the shared memory 131 also change from (0,0) to (0,1) (S14).

In cases where the microprocessor 121(#0) reads data which are part of the control information D10 from another address Y of the shared memory 131 (S15), the microprocessor 121(#0) also acquires each of the counter values (0,1) of the SM update clock T13. Thus, the counter values of the target update clock T13 managed by the microprocessor 121(#0) change from (0,0) to (0,1) (S16).

A case where another microprocessor 121(#1) writes data "10" to address X in the shared memory 131 will now be described (S17). The counter values of the LM update clock T11(#1) managed by the update-source microprocessor 121 change from (0,1) to (0,2). This is because this represents the second update. When the update-source microprocessor 121(#1) writes data "10" to address X, the counter values of the SM update clock T13 are updated from (0,1) to (0,2) (S18). The counter values of the target update clock T13(#1) do not change and remain (0,0).

In cases where the microprocessor 121(#0) is to reference the data at address X, the validity of data "0" cached in the local memory unit 122(#0) is judged (whether the data is the latest data). The microprocessor 121(#0) compares the counter values (0,0) of the LM update clock T11(#0) with the counter values (0,1) of the target update clock T13(#0).

The counter values (0,0) of the LM update clock T11(#0) are smaller than the counter values (0,1) of the target update clock T13(#0). It is therefore judged that the data "0" cached in the local memory unit 122(#0) are old and cannot be used. That is, it is judged that a purge message indicating an update by another microprocessor 121(#1) has not returned to the microprocessor 121(#0).

Therefore, the microprocessor 121(#0) accesses the shared memory 131 and reads the latest data "10" from address X (S19). The latest data "10" thus read are stored in the local memory unit 122(#0). When the microprocessor 121(#0) reads data "10" from the address X in the shared memory 131, the counter values (0,2) of the SM update clock T13 are also read. Thus, the counter values of the target update clock T13(#0) managed by the microprocessor 121(#0) are updated from (0,1) to (0,2) (S20).

When the series of update processes (S13, S17) is complete, the other microprocessor 121(#1) creates an update report purge message and registers same in the purge buffer T10(#1). Thereafter, the other microprocessor 121(#1) transmits all of the purge messages registered in the purge buffer T10(#1) to the microprocessor 121(#0) (S21). The microprocessor 121(#1) updates the data in the shared memory 131 twice (S13, S17) and finally incorporates this data in one purge request purge message (Type=0, line=1, adr=X).

The microprocessor 121(#0) updates the counter values of the LM update clock T11(#0) from (0,0) to (0,2) on the basis of the purge message from the microprocessor 121(#1) (S22).

According to this embodiment, the purge request purge message is issued after a series of updates to the control information D10 in the shared memory 131 is complete. Therefore, the communication frequency of the purge request purge message can be reduced and the load for the purge processing can be reduced. As a result, the processing performance of the storage controller 10 can be increased.

In this embodiment, a plurality of control information updates are incorporated in one purge request purge message. Therefore, the communication frequency of the purge request purge message can be reduced and the processing performance of the storage controller 10 can be increased.

In this embodiment, by comparing the counter values of the LM update clock T11 and the counter values of the target update clock T12, the validity of the control information D10L cached in the local memory 122 can be judged. The erroneous usage of old control information can be prevented and consistency in the operation of the storage controller can be improved.

[Embodiment 2]

A second embodiment will now be described with reference to FIGS. 9 to 15. The following embodiments including this embodiment each correspond to modified examples of the first embodiment. Hence, each of the following embodiments will be described by focusing on the differences with respect to the first embodiment. In this embodiment, the control information is categorized into a plurality of categories on the basis of its technical properties and control which is suited to the respective categories is exercised. That is, in this embodiment, predetermined cache attributes are set for the control information and managed.

Figure 9:
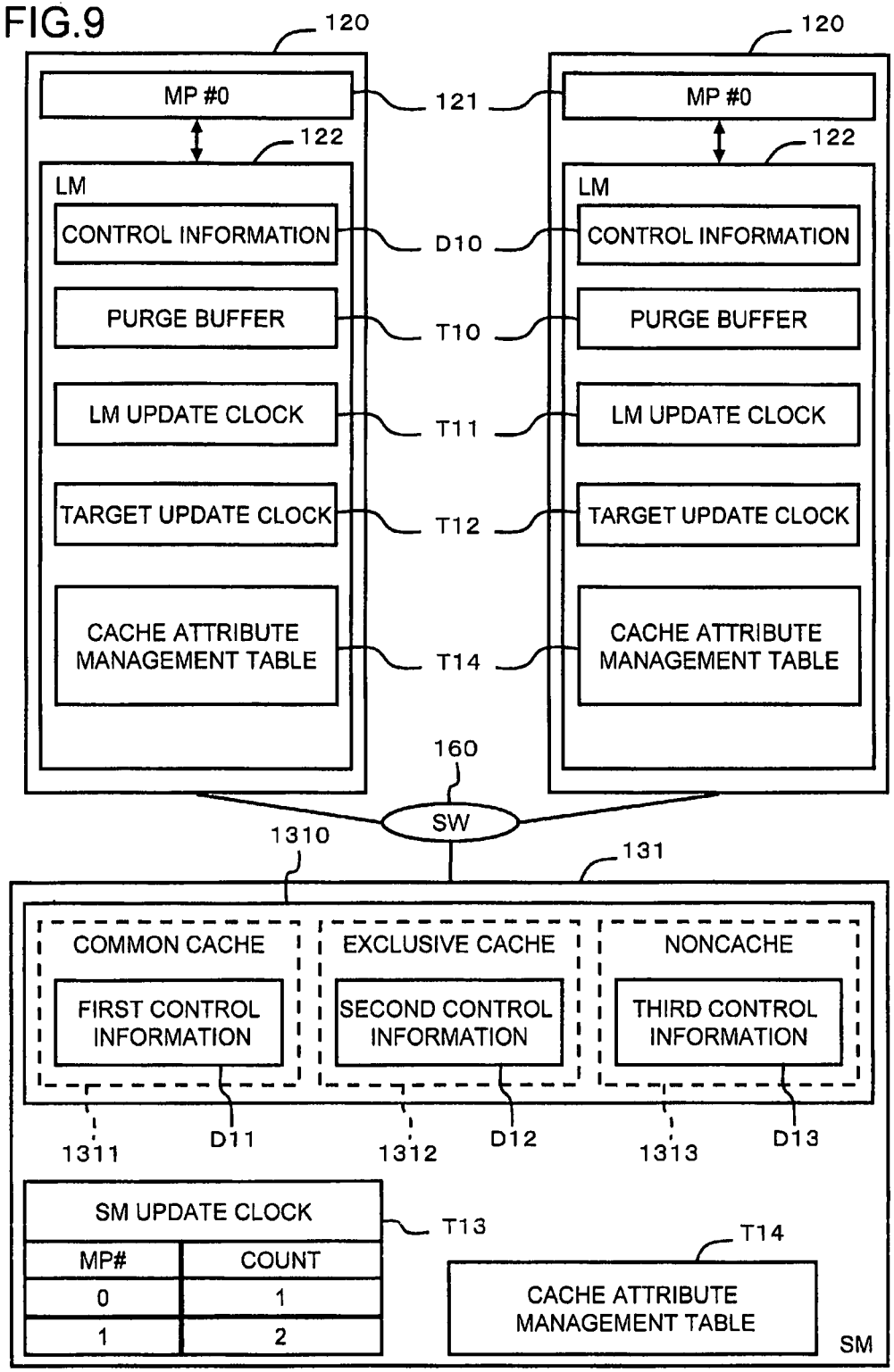
[FIG. 9]

FIG. 9 shows essential parts of the storage controller 10 of this embodiment. If we consider the shared memory 131 in this embodiment, three regions 1311, 1312, and 1313 are also created in the control information storage region 1310.

The first region 1311 is a common cache region. The common cache region 1311 stores first control information D11. The first control information D11 is shared by each of the microprocessors 121 and cached in each of the local memory units 122.

Figure 11:
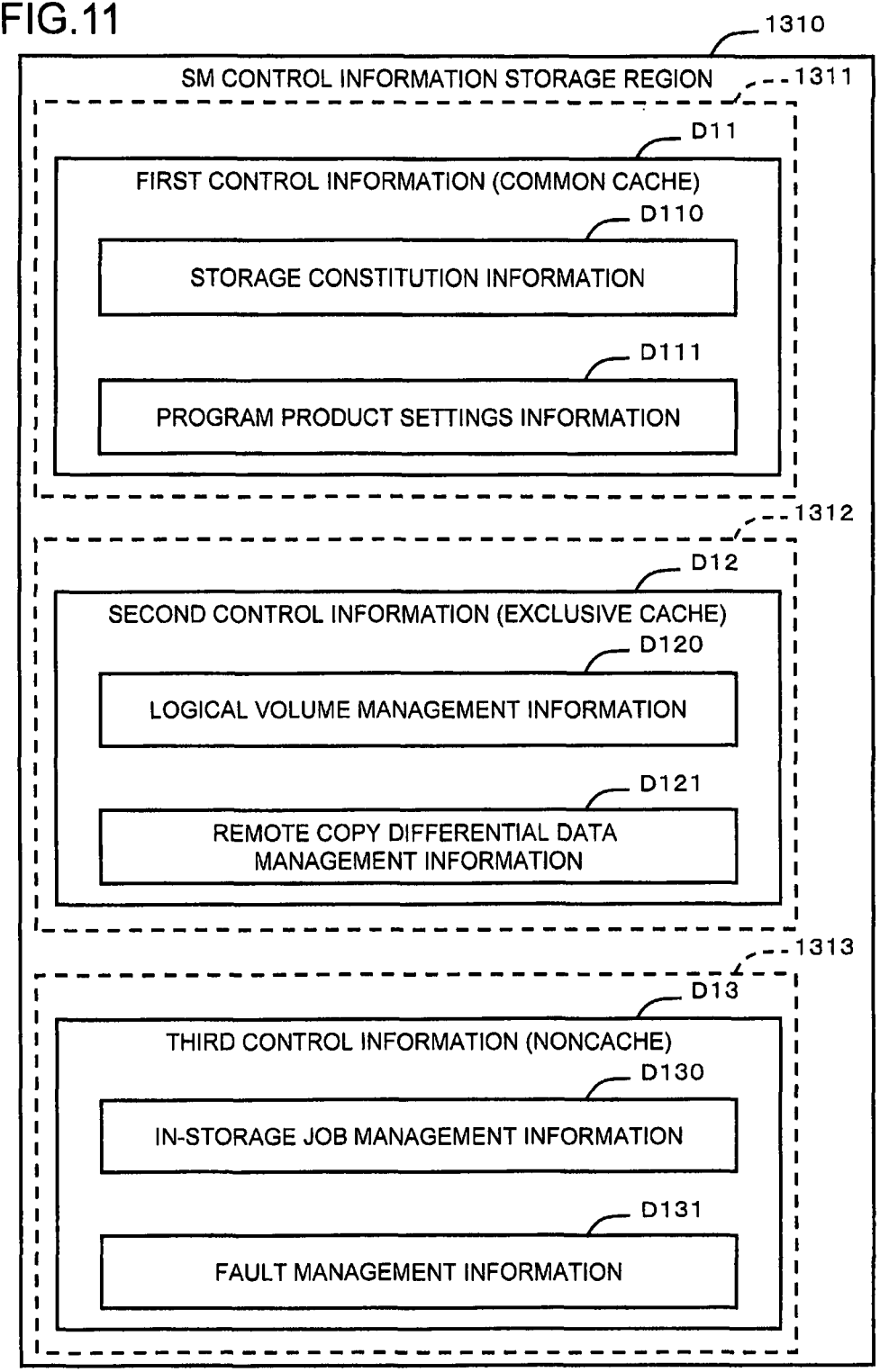
[FIG. 11]

As shown in FIG. 11, the first control information D11 corresponds to information which has a relatively low update frequency but which can be referenced with a relatively high frequency by the plurality of microprocessors 121, such as information D110 for managing the constitution of the storage controller 10 and program product settings information D111 and so forth, for example.

The second region 1312 is an exclusive cache region. The exclusive cache region 1312 stores second control information D12. The second control information D12 can only be cached by a specified microprocessor 121 which is the owner microprocessor and cannot be cached by the other microprocessors 121. The other microprocessors 121 employ second control information D12 by directly accessing the shared memory 131.

Although only one exclusive cache region 1312 is shown in FIG. 11, there can also be one exclusive cache region 1312 provided for each of the microprocessors 121. That is, each of the microprocessors 121 is capable of creating an exclusive cache region which is an owner exclusive cache region.

The second control information D12 corresponds to information which is updated relatively frequently by a specified microprocessor 121 such as information D120 for managing the logical volumes 152 and information D121 for managing differential data for a remote copy, for example, as shown in FIG. 11.

The third region 1313 is a noncache region. The noncache region 1313 stores the third control information D13. The third control information D13 cannot be cached by any of the microprocessors 121.

The third control information D13 corresponds to information with a relatively low update frequency such as information D130 for managing various jobs which are executed in the storage controller 10 and fault-related management information D131, for example, as shown in FIG. 11. However, examples of the first to third control information are not limited to those mentioned above.

The cache attributes (common cache, exclusive cache, noncache) are managed by the cache attribute management table T14. The cache attribute management table T14 is stored in the shared memory 131. Each of the local memory units 122 has a copy of the cache attribute management table T14 which is stored in the shared memory 131.

Figure 10:
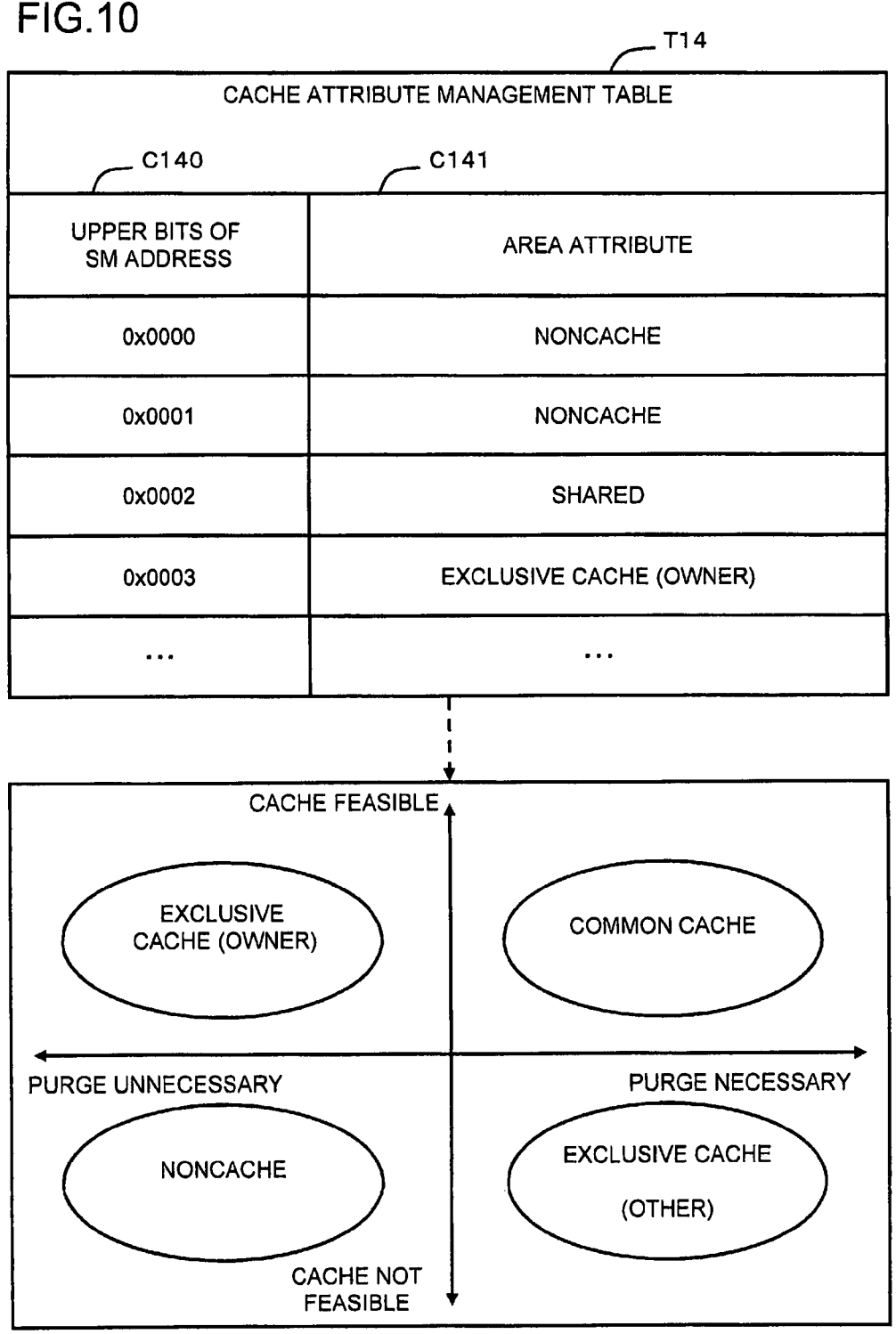
[FIG. 10]

The upper half of FIG. 10 shows the cache attribute management table T14. The cache attribute management table T14 comprises a field C140 which shows the upper bits of the SM address (shared memory), and an area attribute field C141, for example. The lower half of FIG. 10 schematically shows the relationship between the area attributes.

This embodiment creates SM cache attributes for each of the upper bits of an SM address. In the example in FIG. 10, supposing that an SM address has 32 bits, 0x00000000-0x0001FFFF is the noncache, 0x00020000-0x0002FFFF is the common cache, and 0x00030000-0x0003FFFF is the exclusive cache (owner MP is #0). In cases where reading or writing from or to the common memory 131 is performed, the table T14 shown in the upper half of FIG. 10 is referenced to judge the area attribute of the address which is to be addressed. The control information items D11, D12, and D13 do not exist as respective groups of contiguous regions but instead can be freely created for each address range determined in Table T14.

The first control information D11 which has the common cache attribute is cached by the plurality of microprocessors 121. In the case of the second control information D12 which has the exclusive cache attribute, the owner microprocessor is able to cache the second control information D12 but the microprocessors other than the owner microprocessor are incapable of caching the second control information D12. The third control information D13 which has the noncache attribute cannot be cached by any of the microprocessors 121.

Cache feasibility and purge message transmission feasibility are closely related. All of the microprocessors 121 are allowed to cache the first control information D11. When the first control information D11 in the shared memory 131 is updated, each of the microprocessors 121 creates a purge message and transmit the purge message to each of the other microprocessors 121 at a predetermined time.

A case where information with the exclusive cache attribute is updated will now be described. Even when the owner microprocessor updates the second control information D12 in the shared memory 131, the owner microprocessor need not create a purge message and transmit the purge message to each of the other microprocessors. This is because only the owner microprocessor is capable of caching the second control information D12.

In contrast, in cases where the microprocessors 121 other than the owner microprocessor update the second control information D12 in the shared memory 131, the other microprocessors 121 create a purge message and transmit the purge message to the owner microprocessor alone. This is because the owner microprocessor uses the second control information D12 in the shared memory 131 by copying same to the local memory units 122.

A case where information with the noncache attribute is updated will now be described. None of the microprocessors 121 is able to use the third control information D13 with the noncache attribute by copying same to the local memory units 122. Therefore, even when the microprocessors 121 update the third control information D13 in the shared memory 131, there is no need to create and transmit a purge message.

Figure 12:
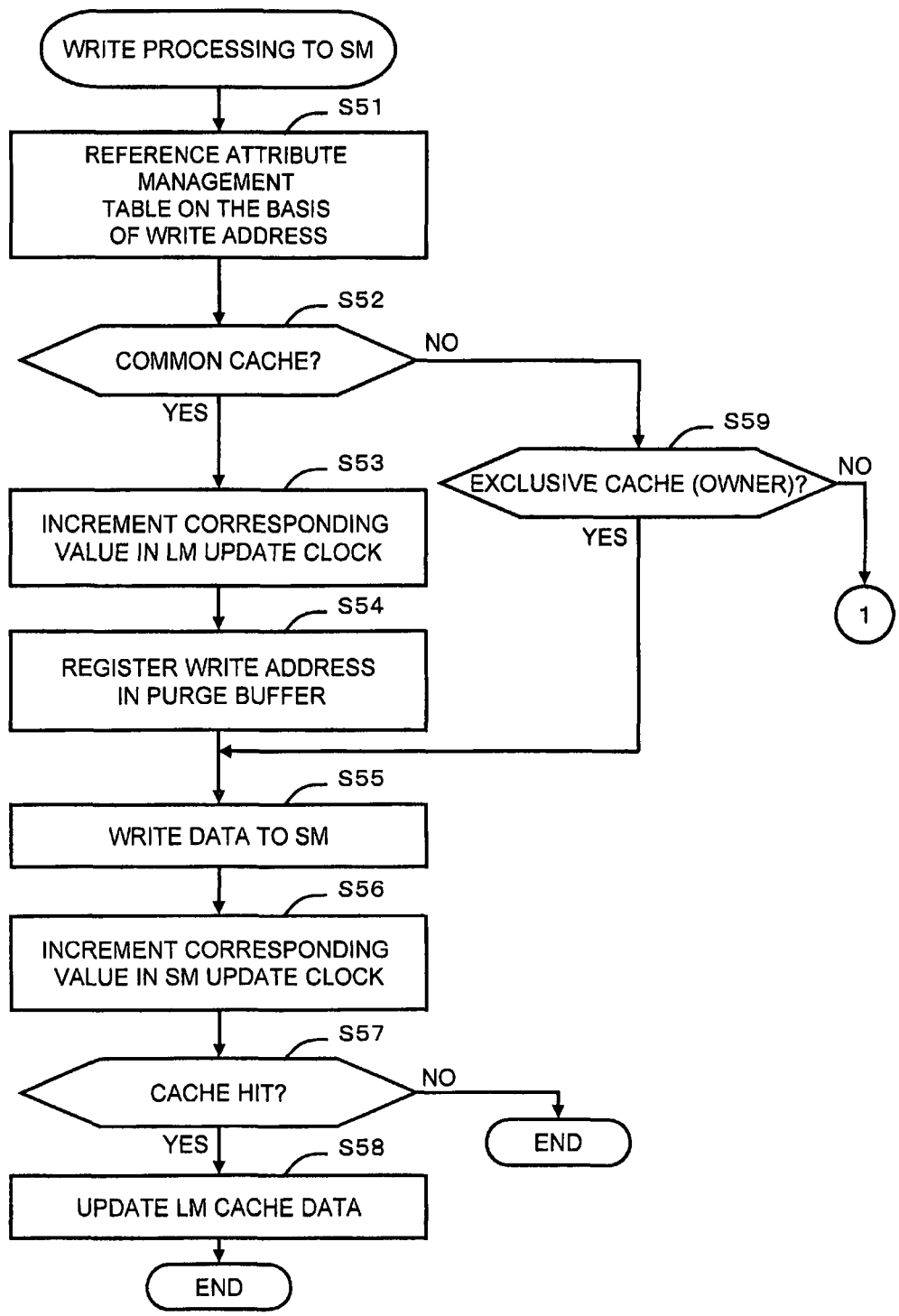
[FIG. 12]
Figure 13:
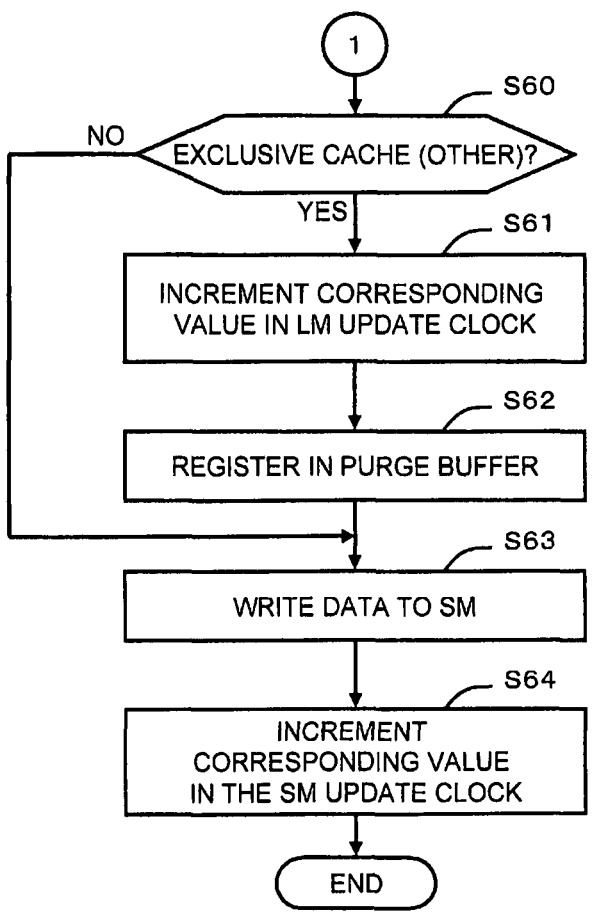
[FIG. 13]

FIG. 12 is a flowchart of processing for a case where data (control information) is written to the shared memory 131. The microprocessors 121 reference the cache attribute management table T14 on the basis of a write address (S51). A microprocessor which is going to update data in the shared memory 131 is called an update-source microprocessor.

The microprocessor 121 judges whether write access is contained in the common cache region 1311 (S52). In cases where data is written to the common cache region 1311 (S52: YES), that is, where the first control information D11 is updated, the microprocessor 121 increases the corresponding counter value in the LM update clock T11 managed by the microprocessor 121 by one (S53). That is, the update-source microprocessor 121 increases the counter value of the update-source microprocessor 121 in the LM update clock T11 which is managed by the update-source microprocessor 121 by one.

In addition, the update-source microprocessor 121 registers the write access and the size of the write data in the purge buffer T10 managed by the update-source microprocessor 121 (S54).

The update-source microprocessor 121 writes new data to the shared memory 131 (S55) and increases the counter value of the update-source microprocessor 121 in the SM update clock T13 by one (S56).

The update-source microprocessor 121 judges whether data to be updated (control information D11 to be updated) has been copied to the local memory units 122 (S57). In cases where the data to be updated has been copied to the local memory units 122 (S57:YES), that is, in the case of a cache hit (S57:YES), the update-source microprocessor 121 updates the control information copied to the local memory units 122 (S58).

In the case of a cache miss (S57:NO), this processing is terminated. The constitution may be such that, in the event of a cache miss, the updated control information D11 in the shared memory 131 may be read and copied to the local memory units 122. In this case, the counter values in the target update clock T12 managed by the update-source microprocessor 121 are updated with the counter values in the SM update clock T13.

In cases where the write address does not exist in the common cache region (S52:NO), the update-source microprocessor 121 judges whether the write address exists in the exclusive cache region 1312 for which the update-source microprocessor 121 is the owner (S59).

In cases where the second control information D12 in the exclusive cache region 1312 for which the update-source microprocessor 121 is the owner is updated (S59:YES), there is no need to create and save a purge message. S53 and S54 are therefore skipped and the processing moves to S55.

In cases where the write address does not exist in the exclusive cache region 1312 for which the update-source microprocessor 121 is the owner (S59:NO), the update-source microprocessor 121 judges whether the write address exists in the exclusive cache region for which the update-source microprocessor 121 is not the owner (S60).

In cases where the second control information D12 in the exclusive cache region for which the update-source microprocessor 121 is not the owner is updated (S60:YES), the update-source microprocessor 121 is "a microprocessor other than the owner microprocessor".

The update-source microprocessor 121 increases by one the counter value for the update-source microprocessor 121 in the LM update clock T11 managed by the update-source microprocessor 121 (S61). In addition, the update-source microprocessor 121 registers the write address and size of the write data in the purge buffer T10 (S62).

The update-source microprocessor 121 updates the second control information D12 in the shared memory 131 (S63) and increases the counter value for the update-source microprocessor 121 in the SM update clock T13 by one (S64).

In cases where the write address does not exist in the exclusive cache region for which the update-source microprocessor 121 is not the owner microprocessor (S60:NO), the write address exists in the noncache region 1313. Therefore, the update-source microprocessor 121 skips S61 and S62 and moves to S63. The third control information D13 which belongs to the noncache region 1313 cannot be cached by any of the microprocessors 121 and there is therefore no need to create and save a purge message.

Figure 14:
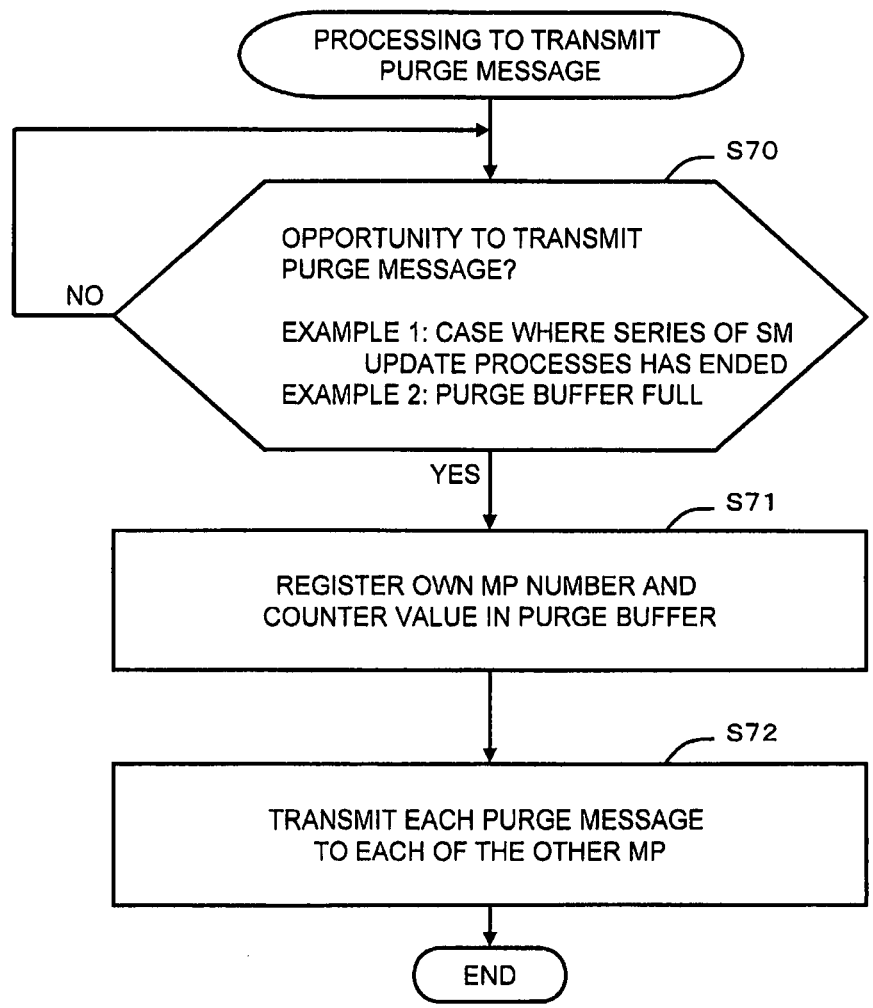
[FIG. 14]

FIG. 14 is a flowchart showing processing to transmit a purge message to the other microprocessors 121. Here, a microprocessor which transmits a purge message is called an issuing-source microprocessor.

The issuing-source microprocessor 121 judges whether an opportunity to transmit a purge message has arisen (S70). For example, in cases where a series of updates to the control information stored in the shared memory 131 is complete, a purge message is transmitted in accordance with an explicit instruction from a program related to this update. Alternatively, a purge message is transmitted when the number of purge messages saved in the purge buffer T10 reaches a predetermined upper limit value, for example. Another such transmission opportunity may also be adopted.

When the transmission opportunity arises (S70:YES), the issuing source microprocessor 121 creates an update report purge message (S71). That is, the issuing-source microprocessor 121 registers the microprocessor number of the issuing-source microprocessor 121 and the counter value for the issuing-source microprocessor 121 in the LM update clock T11 in the purge buffer T10 (S71).

The issuing-source microprocessor 121 then transmits each purge message in the purge buffer T10 to each of the other microprocessors 121 (S72). However, in the case of a purge message associated with the second control information D12, the issuing-source microprocessor 121 transmits the purge message only to the owner microprocessor when the issuing-source microprocessor 121 is a microprocessor other than the owner microprocessor.

Figure 15:
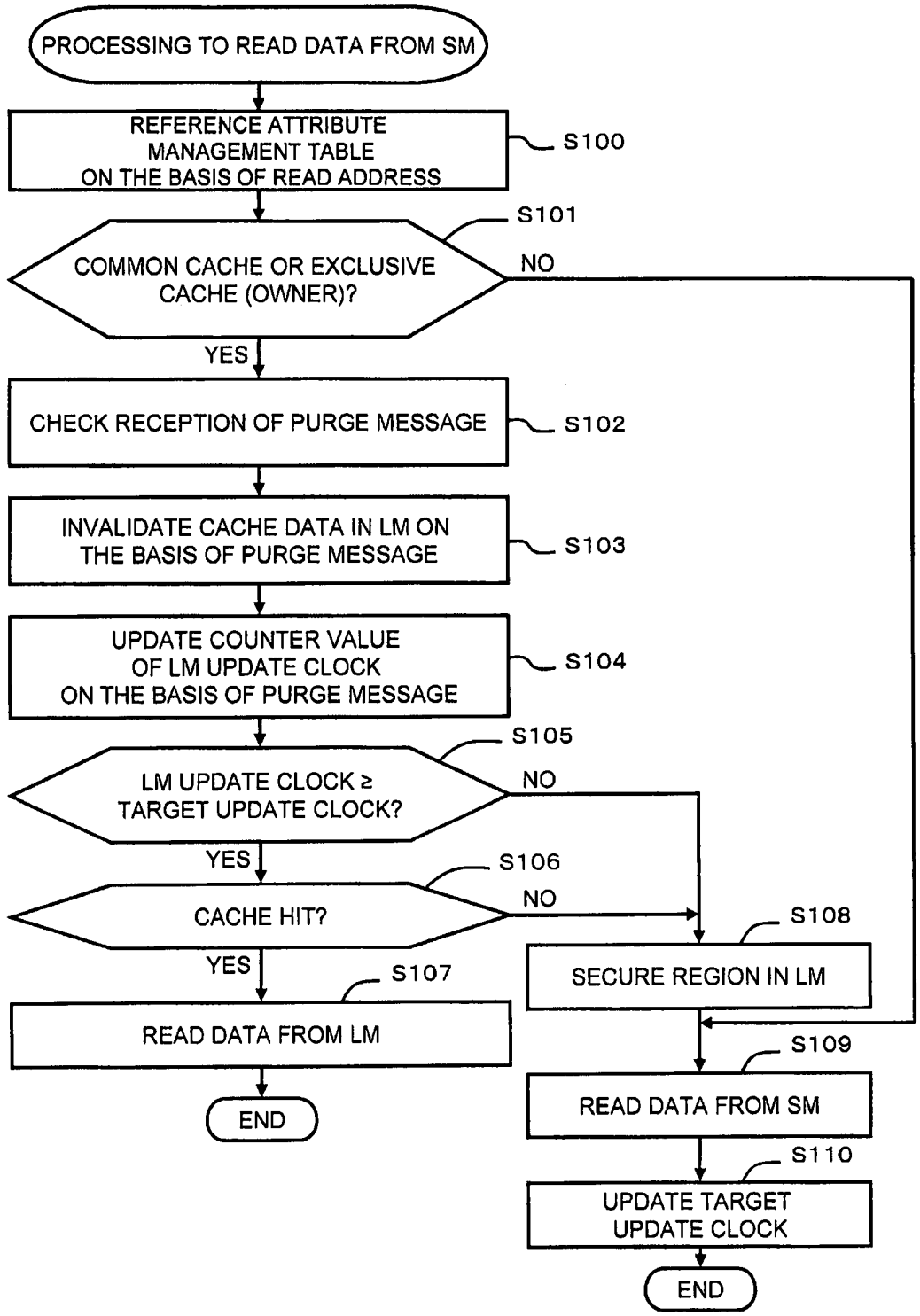
[FIG. 15]

FIG. 15 is a flowchart showing processing for a case where data (control information) are read from the shared memory 131. The microprocessor which reads the data is called the reading-source microprocessor here.

The reading-source microprocessor 121 references the cache attribute management table T14 on the basis of the read address (S100). The reading-source microprocessor 121 judges whether the read address is in either the common cache region 1311 or the exclusive cache region (owner) (S101).

Here, the exclusive cache region (owner) is an exclusive cache region for which the microprocessor is the owner. In contrast, the exclusive cache region (other) indicates an exclusive cache region for which a microprocessor is not the owner.

In cases where the read address is contained in either the common cache region 1311 or the exclusive cache region (owner) 1312 (S101:YES), the reading-source microprocessor 121 checks whether a purge message has arrived from each of the other microprocessors 121 (S102).

The reading-source microprocessor 121 invalidates some or all of the cache data in the local memory units 122 (control information copied to the local memory units 122) on the basis of the purge message (S103).

In addition, the reading-source microprocessor 121 updates the counter values in the LM update clock T11 on the basis of the update report purge message which has arrived from each of the other microprocessors 121 (S104).

The reading-source microprocessor 121 judges whether each of the counter values in the LM update clock T11 is equal to or more than each of the corresponding counter values in the target update clock T12 (S105). In cases where the LM update clock T11>=the target update clock T12 (S105:YES), the control information copied to the local memory units 122 is judged as being valid.

The reading-source microprocessor 121 checks whether the desired data exists in the local memory units 122 (S106). In cases where the desired data exists in the local memory units 122 (S106:YES), the data are valid and therefore the reading-source microprocessor 121 uses the desired data by reading same from the local memory units 122 (S107).

In either a case where the LM update clock T11<the target update clock T12 (S105:NO) or where the validated data has not been stored in the local memory units 122 (S106:NO), the processing moves to S108.

The reading-source microprocessor 121 secures a storage region in the local memory units 122 (S108) and uses the desired data by reading same from the shared memory 131 (S109). The reading-source microprocessor 121 acquires each of the counter values of the SM update clock T13 and updates each of the counter values in the target update clock T12 with these counter values (S110).

In cases where a read address exists in the exclusive cache region (other) or the noncache region (S101:NO), the processing moves to S109 and the desired data are read directly from the shared memory 131.

This embodiment which is so constituted affords the same effects as those of the first embodiment. Furthermore, with this embodiment, common cache, exclusive cache, and noncache are prepared as attributes for the control information stored in the shared memory 131 and purge control is carried out in accordance with these attributes. The creation of purge messages and transmission-related processing can therefore be reduced and the processing resources and so forth of each of the microprocessors 121 can be utilized more effectively.

[Embodiment 3]

Figure 16:
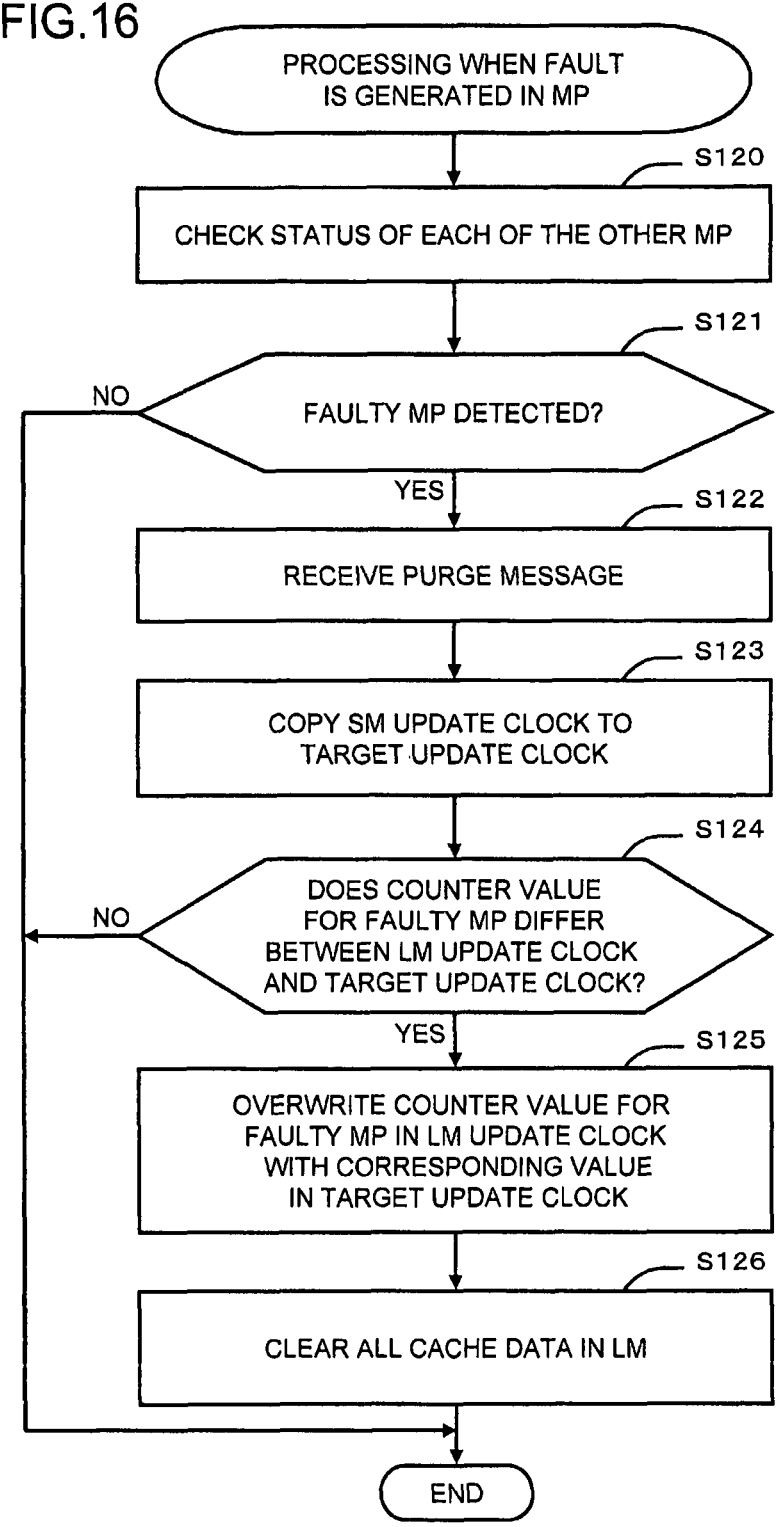
[FIG. 16]

A third embodiment will now be described based on FIGS. 16 and 17. In this embodiment, a mapping method for a case where a fault is generated in the microprocessor 121 will be described. As mentioned earlier, the present invention differentiates between a time for updating the control information in the shared memory 131 and a time for transmitting a purge message in order to reduce the amount of purge message communication.

Hence, in cases where a fault of some kind is generated in the microprocessor 121, there is a possibility that a purge message which is to be reported will not be reported to each of the microprocessors 121 and that the microprocessor 121 will stop functioning.

Therefore, this embodiment executes the following processing when a fault is generated. A microprocessor in which a fault is generated is sometimes called a 'faulty microprocessor'. First, the microprocessor 121 checks the status of each of the other microprocessors 121 (S120). For example, each of the microprocessors 121 writes its own status in a predetermined storage region. The status of each of the other microprocessors 121 can be determined by referencing the values written to the desired storage region.

The microprocessor 121 judges whether a faulty microprocessor has been detected (S121). When a faulty microprocessor is detected (S121:YES), the microprocessor 121 receives a purge message from each of the other microprocessors (S122). In addition, the microprocessor 121 reads the counter values in the SM update clock T13 and copies the counter values to the target update clock T12 (S123).

The microprocessor 121 judges, for the counter value of the faulty microprocessor, whether the value in the LM update clock T11 and the value in the target update clock T12 differ (S124). That is, the microprocessor 121 judges whether there is a discrepancy between the counter value for the faulty microprocessor in the LM update clock T11 and the counter value for the faulty microprocessor in the target update clock T12 (S124).

In the event of a discrepancy between the counter value in the LM update clock T11 and the counter value in the target update clock T12 (S124:YES), the microprocessor 121 overwrites the counter value for the faulty microprocessor in the LM update clock T11 with the counter value for the faulty microprocessor in the target update clock T12 (S125).

This is because, when there is a discrepancy between the counter value in the LM update clock T11 and the counter value in the target update clock T12 (S124:YES), the faulty microprocessor judges that the microprocessor has stopped before transmitting the purge message which is to be transmitted. When the control information in the shared memory 131 is overwritten, the counter value in the SM update clock T13 is updated. Hence, even when the faulty microprocessor stops before transmitting the purge message, the counter value in the SM update clock T13 can be trusted.

The microprocessor 121 discards all of the cache data (control information copy data) in the local memory units 122 which it manages and terminates the processing (S126). It is evident that the faulty microprocessor has stopped prior to transmitting the purge message which is to be transmitted, but it cannot be confirmed what part of the control information has been updated. All of the cache data is therefore cleared at once.

Figure 17:
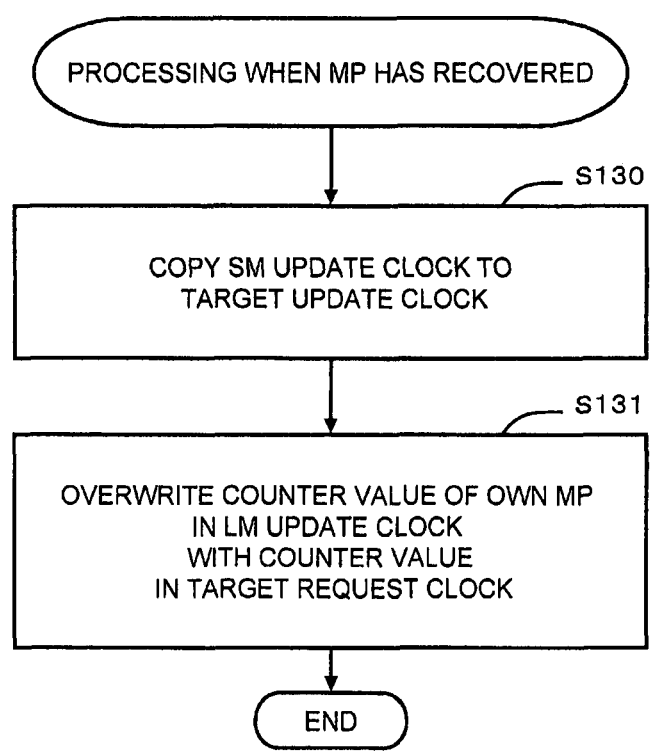
[FIG. 17]

FIG. 17 shows processing for a case where a faulty microprocessor has recovered from a fault. For example, in cases where the microprocessor package 120 containing the faulty microprocessor is exchanged for a normal microprocessor package 120, the flowchart in FIG. 17 is executed. The processing in FIG. 17 can also be applied in cases where the microprocessor package 120 is added to the storage controller 10.

A microprocessor which has recovered from a fault is called a recovered microprocessor. The recovered microprocessor 121 overwrites the counter value for the recovered microprocessor in the LM update clock T11 with the counter value for the recovered microprocessor in the target update clock T12 (S131). The counter value for the recovered microprocessor in the LM update clock T11 which is managed by the recovered microprocessor can thus be restored to the correct value.

This embodiment which is so constituted affords the same effects as those of the first embodiment. This embodiment is also capable of suitably responding to a fault irrespective of which microprocessor 121 the fault is generated in and the reliability of the storage controller 10 therefore improves.

[Embodiment 4]

Figure 18:
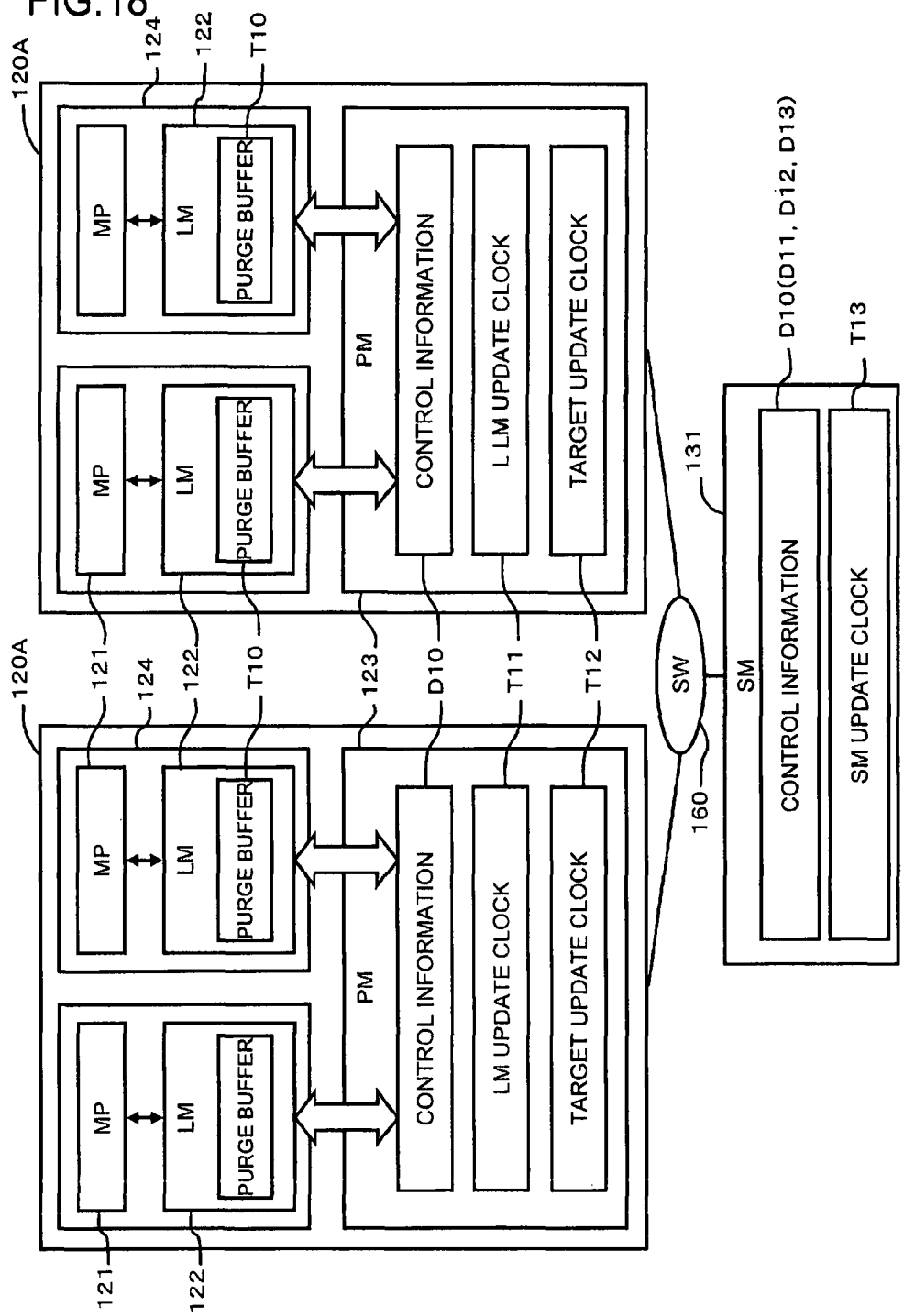
[FIG. 18]

A fourth embodiment will now be described based on FIG. 18. FIG. 18 is a block diagram showing the essential parts of a storage controller according to this embodiment. The microprocessor package 120A of this embodiment comprises a package memory 123.

The microprocessor package 120A comprises a plurality of subpackages 124 and a package memory 123 which is shared by the plurality of subpackages 124. Each of the subpackages 124 comprises a microprocessor 121 and a local memory unit 122.

The package memory 123 stores control information D10, an LM update clock T11, and a target update clock T12. A purge buffer T10 is provided in each of the local memory units 122 and not provided in the package memory 123. In order to reduce the amount of purge messages by utilizing the access locality of each microprocessor 121, the purge buffer T10 is provided in the local memory units 122. A memory device which can be accessed at relatively high speeds is used as the package memory 123.

Each of the microprocessors 121 in the microprocessor package 120A use control information which is stored in the package memory 123. The microprocessors 121 which are provided in the same microprocessor package 120A each share the same package memory 123 and there is therefore no need for purge message exchange within the microprocessor 120A.

Purge message communications are made only between the microprocessor packages 120A in this embodiment. This embodiment therefore permits a lower frequency for communicating the purge messages and a smaller amount of purge message communication than the first embodiment.

The present invention is not limited to the above embodiments. A person skilled in the art is able to make various additions and modifications and so forth within the scope of the present invention. A constitution in which the respective embodiments are suitably combined, for example, is also possible.

The invention claimed is:

1. A storage controller for controlling data inputs and outputs between a host computer and a storage device, comprising:
 a cache memory for storing data inputs and outputs between the host computer and the storage device;
 a shared memory for storing common control information that is required for at least one of command processing and control processing performed by the storage controller, the common control information including program setting information;
 a plurality of microprocessor packages each including a plurality of microprocessors, a package memory to which at least a portion of the common control information stored in the shared memory is copied as local control information items for the plurality of microprocessors of the microprocessor package, a plurality of local memory units which are respectively provided in correspondence with the microprocessors of the microprocessor package, and a plurality of purge message storage units that are respectively included within the local memory units of the microprocessor package for storing purge messages that are each transmitted from the microprocessor corresponding to the respective local memory unit for the purge message storage unit and that are each for reporting that the local control information items stored in the package memories of the other microprocessor packages are invalid; and
 a control information synchronization management unit for managing whether each of the local control information items is in sync with the common control information,
 wherein, in cases where the common control information is updated by any of the microprocessors, the updating microprocessor creates a purge message, stores the purge message in the purge message storage unit of the respective local memory unit for the microprocessor, and transmits a consolidated purge message, into which a plurality of purges messages that have identical, contiguous, or overlapping update locations and are stored in the purge message storage unit of the respective local memory unit for the microprocessor are consolidated, asynchronously with the common control information being updated to a specified one or more of the other microprocessor packages.

2. The storage controller according to claim 1, wherein each of the microprocessor packages and the shared memory are connected via a switch;

the shared memory has, in addition to the common control information, a common control information update management unit for managing an update status of the common control information;

each package memory of the microprocessor packages stores, a local update management unit for managing an update status of the local control information items stored therein, and an update value storage unit which stores a copy of a value indicating the update status managed by the common control information update management unit;

the common control information update management unit manages microprocessor identification information items for identifying each of the microprocessors in each of the microprocessor packages and a counter value indicating a count which is updated by each of the microprocessors in association with each other, and is configured such that, in cases where the common control information is updated by the microprocessor, the counter value corresponding to the microprocessor which is the source of updating of the common control information is updated by the update-source microprocessor;

each of the local update management units also manages the counter values associated with each of the microprocessor identification information items for each of the microprocessors of the microprocessor package within which the local update management unit is included and, in cases where each of the microprocessors corresponding to each of the local update management units updates the local control information items, the counter value associated with the corresponding microprocessor is updated, and the counter values corresponding to the other microprocessors are updated based on the purge message associated with the microprocessors other than the corresponding microprocessor;

in cases where each of the microprocessors corresponding to each of the update value storage units accesses the common control information in the shared memory, each of the counter values managed by the common control information update management unit is acquired and each of the acquired counter values is stored in the update value storage unit by overwriting;

the shared memory includes a common cache region for storing information which each of the microprocessors is capable of copying to the package memory each of the microprocessor package that includes the microprocessor, an exclusive cache region for storing information which only an owner microprocessor configured as an owner among the microprocessors is capable of copying to the package memory local in the microprocessor package that includes the owner microprocessor and which cannot be copied by the microprocessors other than the owner microprocessor, and a noncache region for storing information which none of the microprocessors is able to copy to package memories of the microprocessor packages;

the common cache region stores first information which has a relatively low update frequency but can be accessed relatively frequently by the plurality of microprocessors of each of the microprocessor packages;

the exclusive cache region stores second information which is referenced or updated relatively frequently by the owner microprocessor;

the noncache region stores third information which is referenced or updated relatively frequently by the plurality of microprocessors of each of the microprocessor packages;

each of the microprocessors of each of the microprocessor packages creates a purge message whenever performing updating of the information stored in the common cache region stores the purge message in the purge message storage unit of the respective local memory unit for the microprocessor, and, after a series of update processes are complete, transmits each of the purge messages stored in the purge message storage unit of the respective local memory unit for the microprocessor to each of the other microprocessor packages;

the owner microprocessor does not create a purge message when performing updating of the information stored in the exclusive cache region;

each of the microprocessors of each of the microprocessor packages other than the owner microprocessor creates a purge message whenever performing updating of the information stored in the exclusive cache stores the purge message in the purge message storage unit of the respective local memory unit for the microprocessor, and, after a series of update processes are complete, transmits each of the purge messages stored in the purge message storage unit of the respective local memory unit for the microprocessor to only the microprocessor package that includes the owner microprocessor; and none of the microprocessors of any of the microprocessor packages creates a purge message when performing updating of the information stored in the noncache region.

3. The storage controller according to claim 2, wherein each of the microprocessors monitors whether each of the other microprocessors is performing monitoring normally and, in cases where a fault is generated in any of the microprocessors, acquires each counter value managed by the common control information update management unit and stores each counter value in the update value storage unit by overwriting;

each of the microprocessors judges, for the microprocessor in which the fault is generated, whether a counter value managed by the local update management unit is different from a counter value stored in the update value management unit;

in cases where the counter value managed by the local update management unit differs from the counter value stored in the update value management unit, each of the microprocessors overwrites the counter value for the microprocessor, in which the fault is generated, and which is managed by the local update management unit, with the corresponding counter value in the update value management unit; and each of the microprocessors clears the local control information copied to the package memory of the microprocessor package that includes the microprocessor.

4. The storage controller according to claim 1, wherein each of the microprocessors uses the local control information items from the package memory of the microprocessor package that includes the microprocessor in cases where judgment is made that each of the local control information items is in sync with the common control information based on the control information synchronization management unit, and uses the common control information in the shared memory in cases where judgment is made that each of the local control information items is not in sync with the common control information based on the control information synchronization management unit.

5. The storage controller according to claim 1, wherein the shared memory has, in addition to the common control information, a common control information update management unit for managing an update status of the common control information;

each package memory of the of the microprocessor packages stores a local update management unit for managing an update status of the local control information items stored therein, and an update value storage unit for storing a copy of a value indicating the update status managed by the common control information update management unit; and the control information synchronization management unit is constituted comprising the common control information update management unit, the local update management units, and the update value management units.

6. The storage controller according to claim 5, wherein the common control information update management unit manages microprocessor identification information items for identifying each of the microprocessors in each of the microprocessor packages and a counter value indicating a count which is updated by each of the microprocessors in association with each other, and is configured such that, in cases where the common control information is updated by the microprocessor, the counter value corresponding to the microprocessor which is the source of updating of the microprocessor is updated by the update-source microprocessor; and each of the local update management units also manages the counter values in association with each of the microprocessor identification information items for each of the microprocessors of the microprocessor package within which the local update management unit is included and, in cases where each of the microprocessors corresponding to each of the local update management units updates the local control information items, the counter value associated with the corresponding microprocessor is updated, and the counter values corresponding to the other microprocessors are updated based on the purge messages associated with the microprocessors other than the corresponding microprocessor.

7. The storage controller according to claim 6, wherein, in cases where each of the microprocessors corresponding to each of the update value storage units accesses the common control information in the shared memory, each of the counter values managed by the common control information update management units is acquired and each of the acquired counter values is stored in the update value storage unit by overwriting.

8. The storage controller according to claim 1, wherein the shared memory comprises:

a common cache region for storing information which each of the microprocessors is capable of copying to the package memory of the microprocessor package that includes the microprocessor; and an exclusive cache region for storing information which only an owner microprocessor configured as an owner among the microprocessors is capable of copying to the package memory in the microprocessor package that includes the owner microprocessor and which cannot be copied by the microprocessors other than the owner microprocessor.

9. The storage controller according to claim 1, wherein the shared memory comprises:

a common cache region for storing information which each of the microprocessors is capable of copying to the package memory of the microprocessor package that includes the microprocessor; and a noncache region for storing information which none of the microprocessors is capable of copying to the package memories of the microprocessor packages.

10. The storage controller according to claim 1, wherein the shared memory comprises:

an exclusive cache region for storing information which only an owner microprocessor configured as an owner among the microprocessors is capable of copying to the package memory in the microprocessor package that includes the owner microprocessor and which microprocessors other than the owner microprocessor are incapable of copying; and a noncache region for storing information which none of the microprocessors is capable of copying to the package memories of the microprocessor packages.

11. The storage controller according to claim 1, wherein the shared memory comprises:

a common cache region for storing information which each of the microprocessors is capable of copying to the package memory of the microprocessor package that includes the microprocessor;

an exclusive cache region for storing information which only an owner microprocessor configured as an owner among the microprocessors is capable of copying to the package memory in the microprocessor package that includes the owner microprocessor and which microprocessors other than the owner microprocessor are incapable of copying; and a noncache region for storing information which none of the microprocessors is capable of copying to the package memories of the microprocessor packages.

12. The storage controller according to claim 11, wherein the common cache region stores first information which has a relatively low update frequency but which can be accessed relatively frequently by the plurality of microprocessors;

the exclusive cache region stores second information which the owner microprocessor references or updates relatively frequently; and the noncache region stores third information which is referenced or updated relatively frequently by the plurality of microprocessors.

13. The storage controller according to claim 12, wherein, each of the microprocessors of each of the microprocessor packages creates a purge message whenever performing updating of the information stored in the common cache region, stores the purge message in the purge message storage unit of the respective local memory unit for the microprocessor, and, after a series of update processes are complete, transmits each of the purge messages stored in the purge message storage unit of the respective local memory unit for the microprocessor to each of the other microprocessor packages;

the owner microprocessor does not create a purge message when performing updating of the information stored in the exclusive cache region;

each of the microprocessors of each of the microprocessor packages other than the owner microprocessor creates a purge message whenever performing updating of the information stored in the exclusive cache region, stores the purge message in the purge message storage unit of the respective local memory unit for the microprocessor, and, after a series of update processes are complete, transmits each of the purge messages stored in the purge message storage unit of the respective local memory unit for the microprocessor to only the microprocessor package that includes the owner microprocessor; and none of the microprocessors of any of the microprocessor packages creates a purge message when performing updating of the information stored in the noncache region.

14. The storage controller according to claim 11, wherein, each of the microprocessors of each of the microprocessor packages creates a purge message whenever performing updating of the information stored in the common cache region, stores the purge message in the purge message storage unit of the respective local memory unit for the microprocessor, and, after a series of update processes are complete, transmits each of the purge messages stored in the purge message storage unit of the respective local memory unit for the microprocessor to each of the other microprocessor packages;

the owner microprocessor does not create a purge message when performing updating of the information stored in the exclusive cache region;

each of the microprocessors of each of the microprocessor packages other than the owner microprocessor creates a purge message whenever performing updating of the information stored in the exclusive cache region, stores the purge message in the purge message storage unit of the respective local memory unit for the microprocessor, and, after a series of update processes are complete, transmits each of the purge messages stored in the purge message storage unit of the respective local memory unit for the microprocessor to only the microprocessor package that includes the owner microprocessor; and none of the microprocessors of any of the microprocessor packages creates a purge message when performing updating of the information stored in the noncache region.

15. A method of controlling a storage controller having a cache memory for storing data inputs and outputs between a host computer and a storage device, a shared memory which stores common control information that is required for at least one of command processing and control processing performed by the storage controller and includes program setting information, a plurality of microprocessor packages each including a plurality of microprocessors, a package memory, a plurality of local memory units respectively provided in correspondence with the microprocessors of the microprocessor package, and a plurality of purge message storage units that are respectively included within the local memory units of the microprocessor package, the method comprising:

copying at least a portion of the common control information which is stored in the shared memory as local control information to the package memory of each of the microprocessor packages as local control information items for the plurality of microprocessors of the microprocessor package;

in cases where the common control information is updated by any of the microprocessors, creating and saving a purge message indicating that the local control information stored in the package memories of the other microprocessor packages are invalid in the purge message storage unit respectively included within the local memory unit corresponding to the microprocessor;

in cases where a series of processes for updating the common control information are completed by any of the microprocessors, transmitting a plurality of saved purge messages that have identical, contiguous, or overlapping update locations and are stored in the purge message storage unit of the respective local memory unit for the microprocessor as a consolidated purge message into which the plurality of saved purged messages are consolidated to a specified one or more of the other microprocessor packages; and accessing, by each of the microprocessors of the other microprocessor packages which have received the consolidated purge message, the shared memory to acquire the information of an invalid section in cases where such information is used.

* * * * *